(12) United States Patent
Walser

(10) Patent No.: US 7,934,448 B2
(45) Date of Patent: May 3, 2011

(54) KEBAB MACHINE

(75) Inventor: Glenn E. Walser, Duncanville, TX (US)

(73) Assignee: Automated Food Systems, Inc., Waxahachie, TX (US)

(*) Notice: Subject to any disclaimer, the term of this patent is extended or adjusted under 35 U.S.C. 154(b) by 729 days.

(21) Appl. No.: 10/340,028

(22) Filed: Jan. 10, 2003

(65) Prior Publication Data
US 2004/0065212 A1   Apr. 8, 2004

Related U.S. Application Data

(63) Continuation-in-part of application No. 09/880,697, filed on Jun. 13, 2001, now abandoned, which is a continuation-in-part of application No. 09/427,319, filed on Oct. 26, 1999, now abandoned.

(51) Int. Cl.
*A47J 37/04* (2006.01)
(52) U.S. Cl. ............ 99/420; 99/419; 426/91; 426/134; 227/39; 227/44
(58) Field of Classification Search .................. 99/504, 99/419, 420, 421 R, 421 H, 421 HH, 443 C, 99/352, 353, 485; 198/604, 620, 626.1, 626.2, 198/469.1; 227/100, 103, 120, 117, 110, 227/3, 39, 44; 426/421, 665, 304, 305, 91, 426/134; 29/809, 281.1
See application file for complete search history.

(56) References Cited

U.S. PATENT DOCUMENTS

| | | | | |
|---|---|---|---|---|
| 2,363,503 A | * | 11/1944 | Decker | 428/377 |
| 2,815,530 A | * | 12/1957 | Alexander | 99/419 |
| 3,234,585 A | * | 2/1966 | Snyder | 425/114 |
| 3,405,422 A | * | 10/1968 | Sico et al. | 99/419 |
| 3,452,855 A | * | 7/1969 | Posen et al. | 198/461.1 |
| 3,550,188 A | * | 12/1970 | Howard, Jr. et al. | 99/419 |
| 3,729,774 A | * | 5/1973 | Chow | 99/420 |
| 3,835,761 A | * | 9/1974 | Yamanaka | 29/786 |
| 4,069,960 A | * | 1/1978 | Lowrance | 227/120 |
| 4,130,936 A | * | 12/1978 | Cottrell | 29/809 |
| 4,138,050 A | * | 2/1979 | McKinney et al. | 227/117 |
| 4,180,198 A | * | 12/1979 | Lowrance | 227/120 |

(Continued)

FOREIGN PATENT DOCUMENTS
DE        101 24 119        11/2002

OTHER PUBLICATIONS

Engineering Guide, The Quad Seal Family, Minnesota Rubber and QMR Plastics, Quadian Corp, selected pages(4 pages), Dec. 2001.

*Primary Examiner* — Tu B Hoang
*Assistant Examiner* — Brian Jennison
(74) *Attorney, Agent, or Firm* — Law Office of William Gustavson, PC

(57) ABSTRACT

A kebab machine (10) is disclosed for inserting sticks (12) into various food components (14*a-f*), such as meat, vegetables and the like, automatically. The food components are held within carriers (16) while the individual sticks are conveyed by a stick conveyor (22). A jet of air from air jets (24) drive a pair of sticks into an insertion device (400) where smooth belts (402) drive by rotating rollers (452) drive the sticks through the carriers (16) and food components therein to form the kebab.

18 Claims, 32 Drawing Sheets

U.S. PATENT DOCUMENTS

| | | | | |
|---|---|---|---|---|
| 4,232,811 A | | 11/1980 | Cottrell et al. | 227/117 |
| 4,379,795 A | * | 4/1983 | Walser | 426/304 |
| 4,604,771 A | * | 8/1986 | Dolle | 426/421 |
| 4,729,501 A | * | 3/1988 | Lowrance | 227/117 |
| 4,842,181 A | * | 6/1989 | Walser | 227/3 |
| 5,069,292 A | * | 12/1991 | Baker et al. | 171/1 |
| 5,109,757 A | * | 5/1992 | Dolle | 99/419 |
| 5,127,319 A | * | 7/1992 | Dolle | 99/419 |
| 5,174,195 A | * | 12/1992 | Anderson | 99/419 |
| 5,516,540 A | * | 5/1996 | Cathenaut | 426/249 |
| 5,699,651 A | * | 12/1997 | Miller et al. | 53/448 |
| 5,740,722 A | * | 4/1998 | Emsens | 99/419 |
| 5,783,239 A | * | 7/1998 | Callens et al. | 426/68 |
| 5,876,764 A | * | 3/1999 | Buttin et al. | 425/9 |
| 6,161,471 A | * | 12/2000 | Emsens | 99/419 |
| 6,505,731 B2 | * | 1/2003 | Lambertz | 198/468.9 |

* cited by examiner

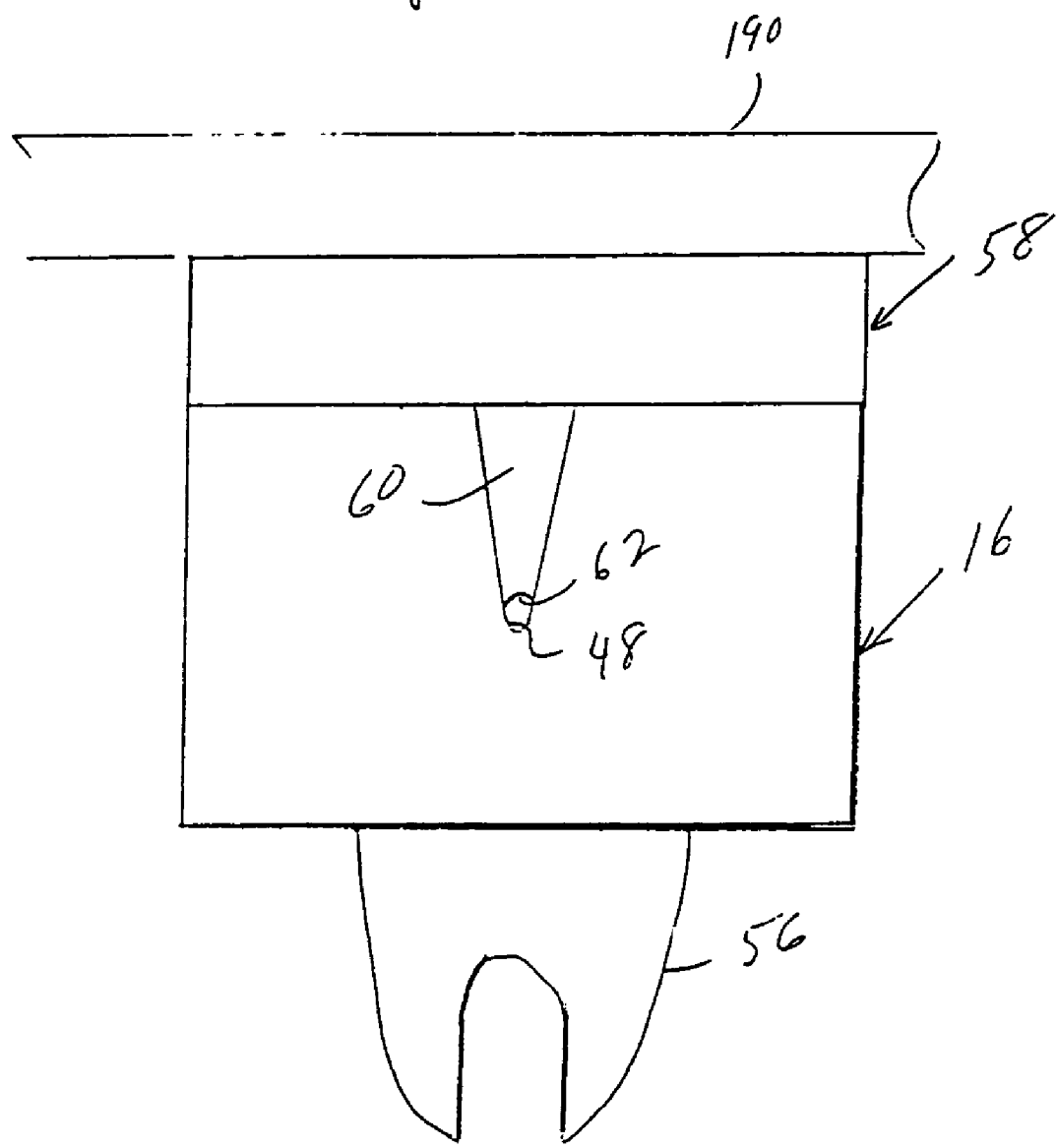

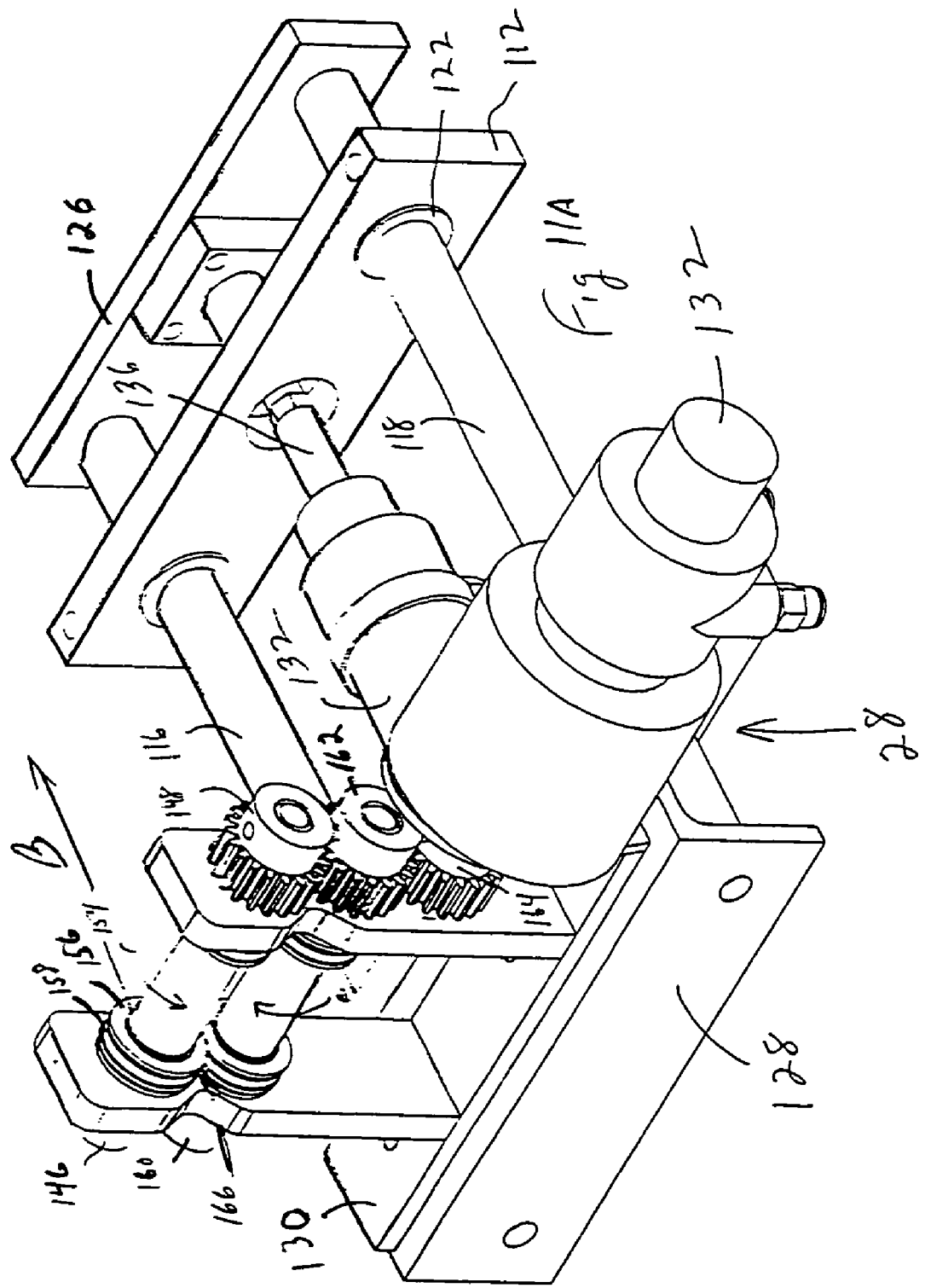

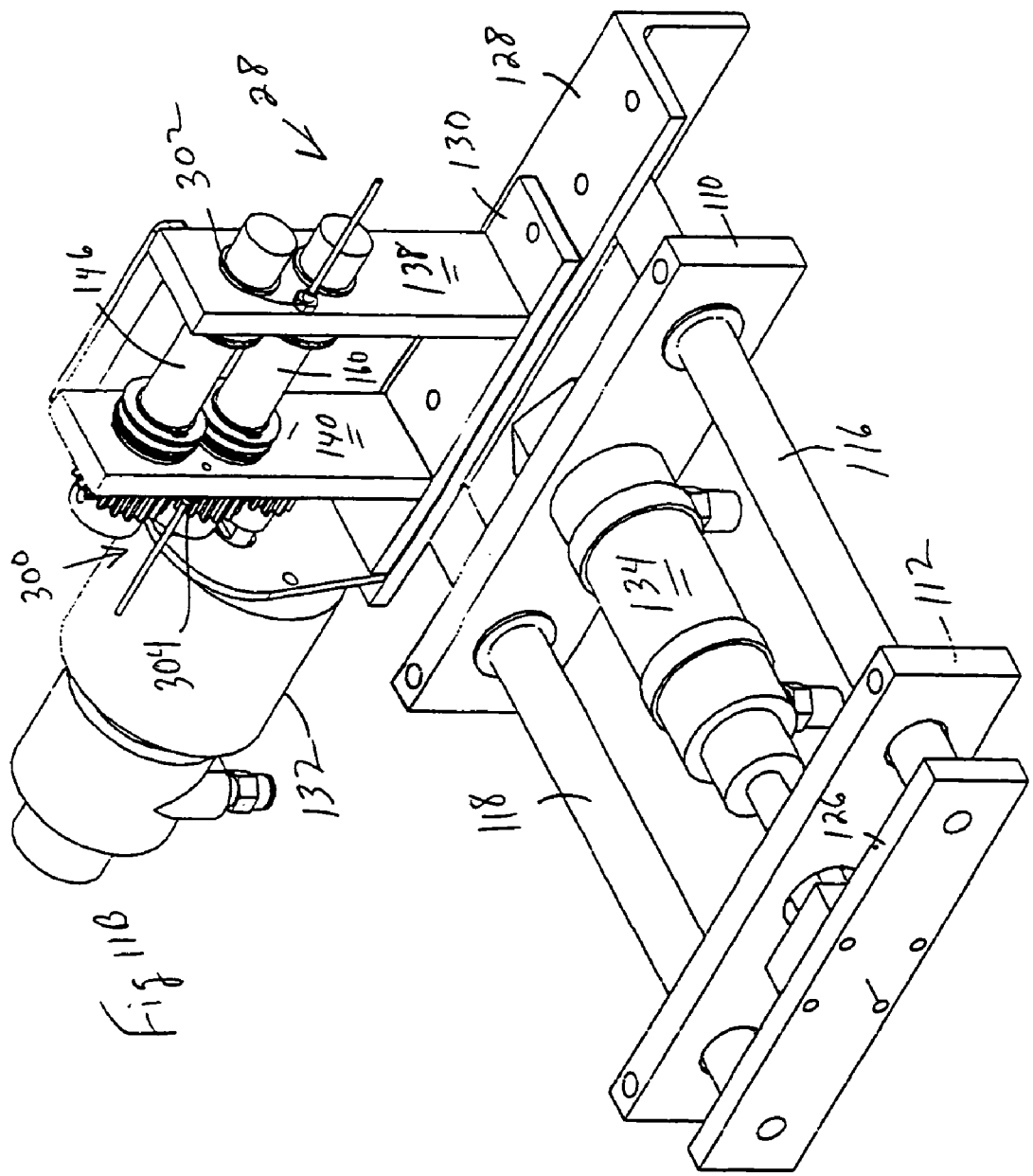

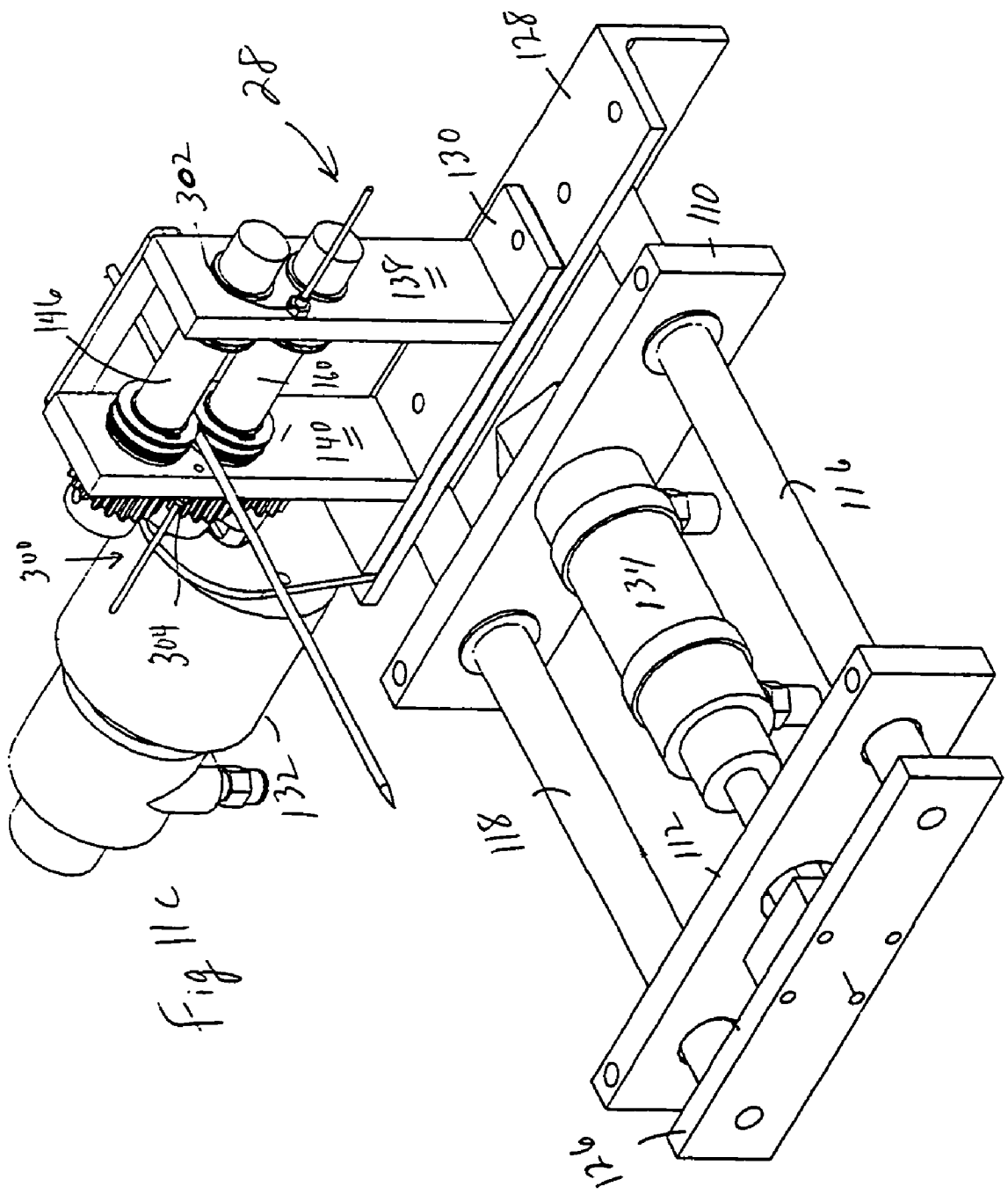

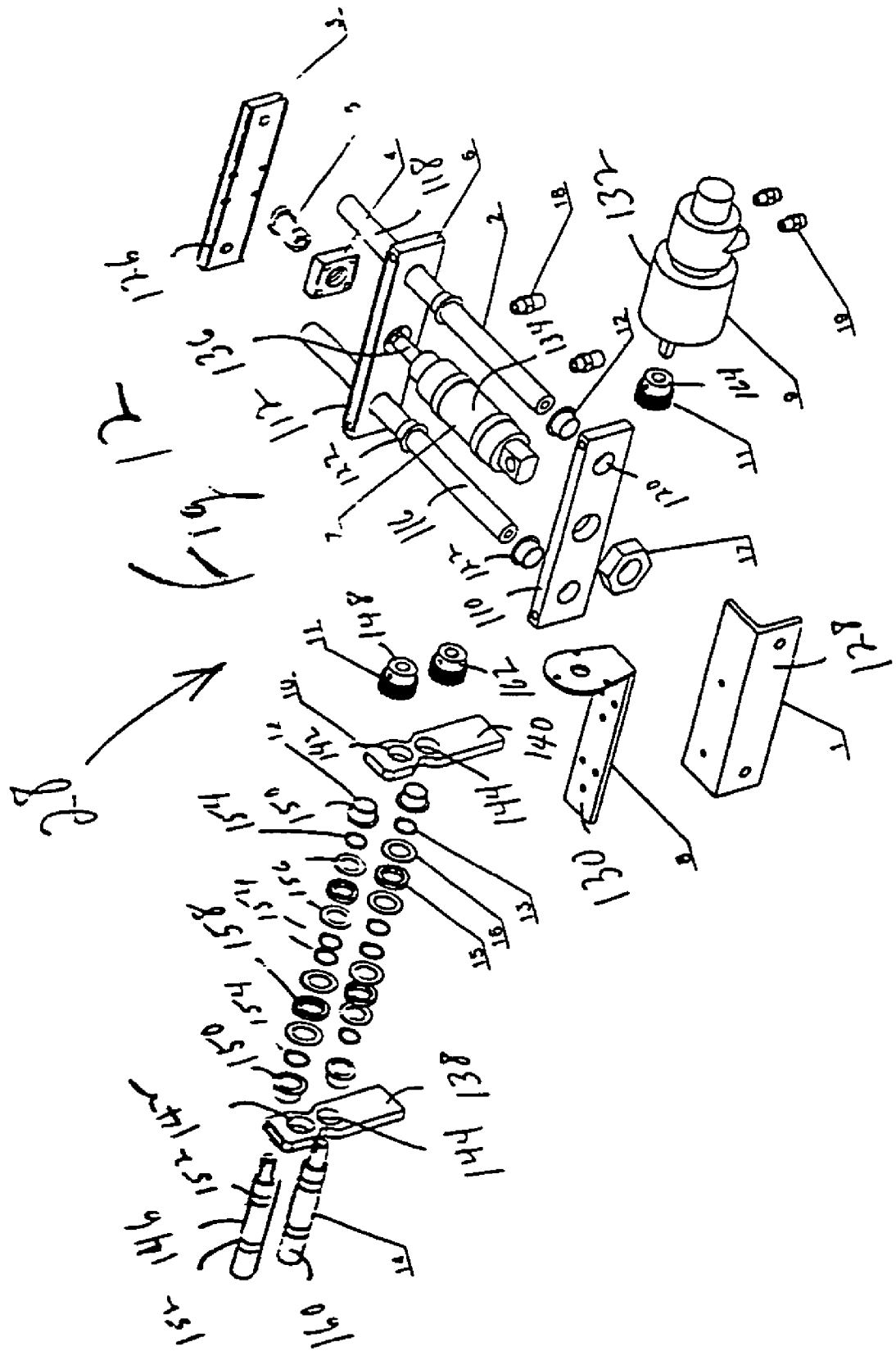

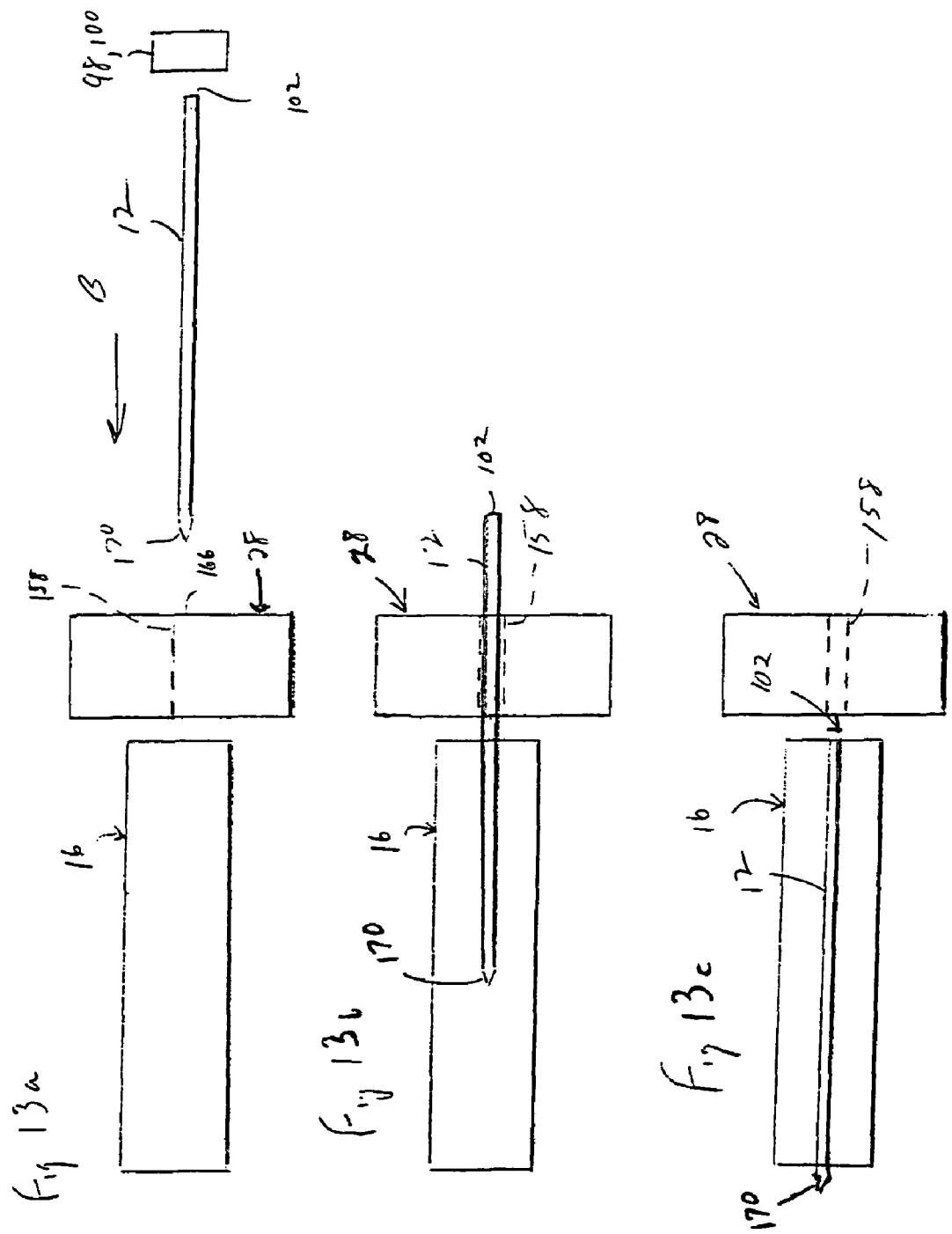

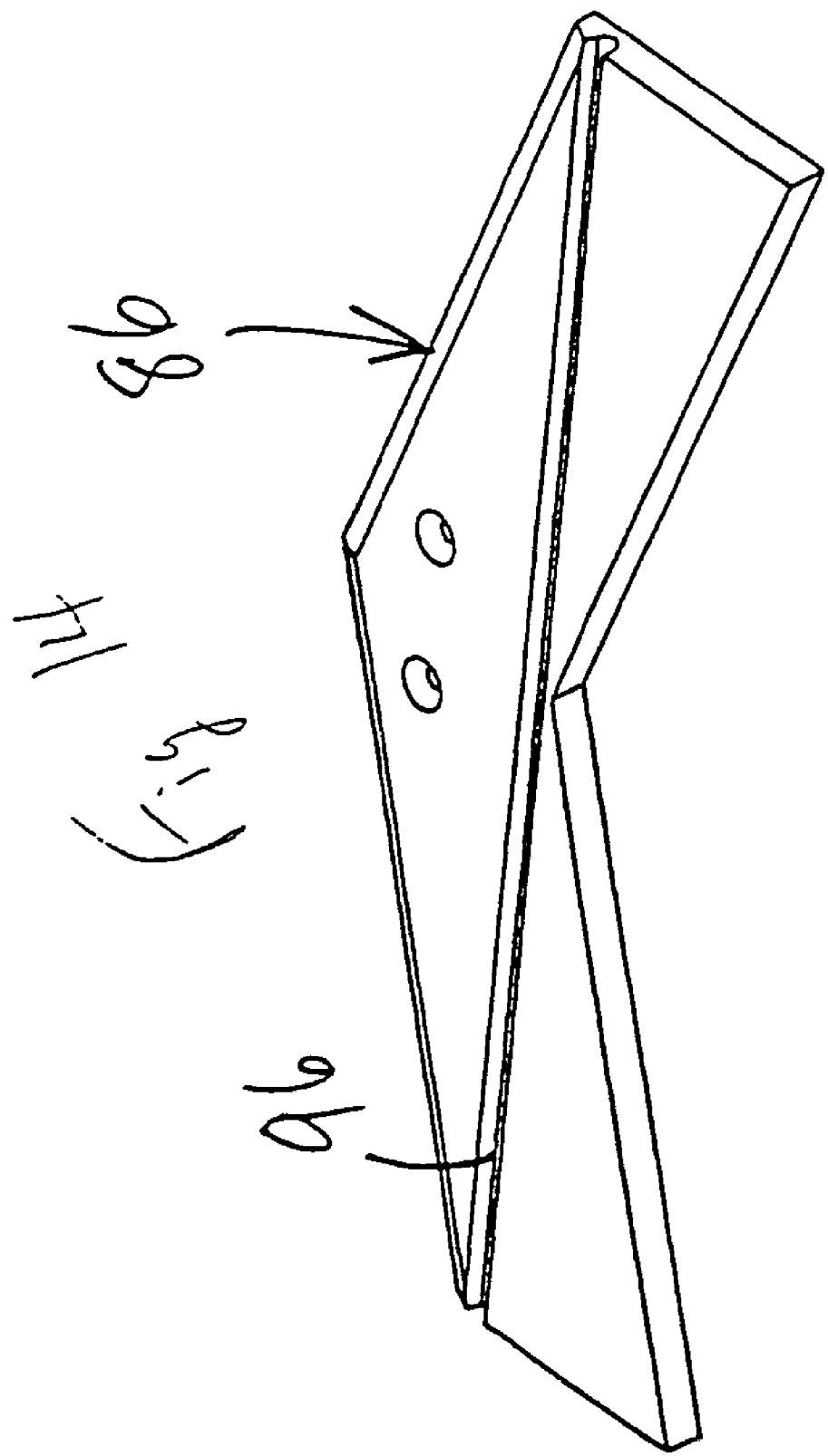

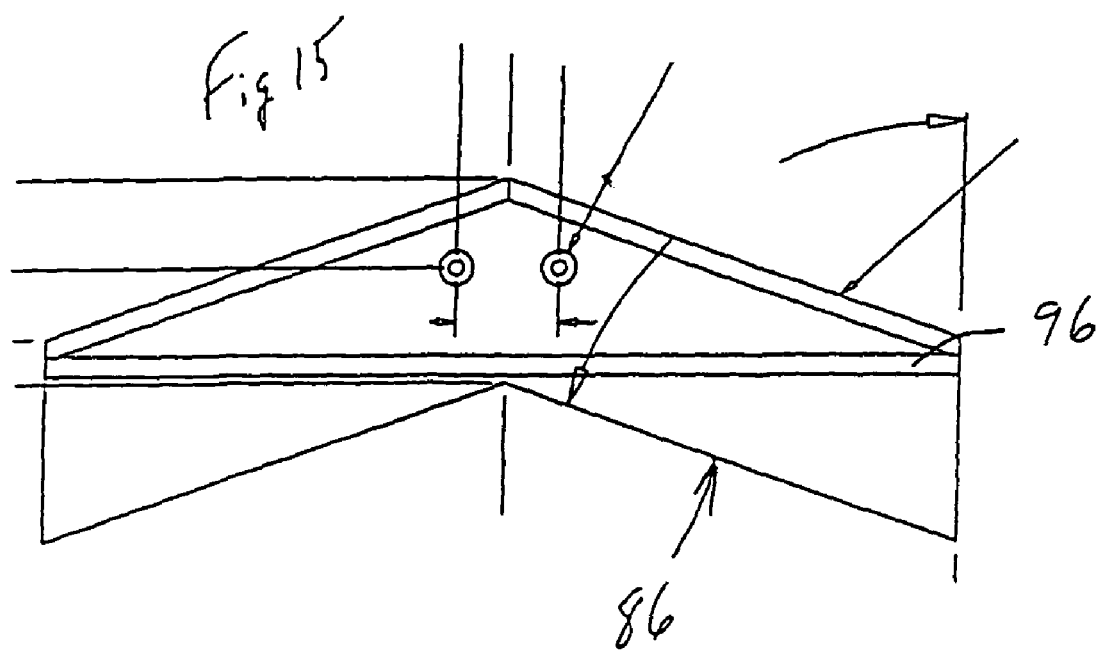

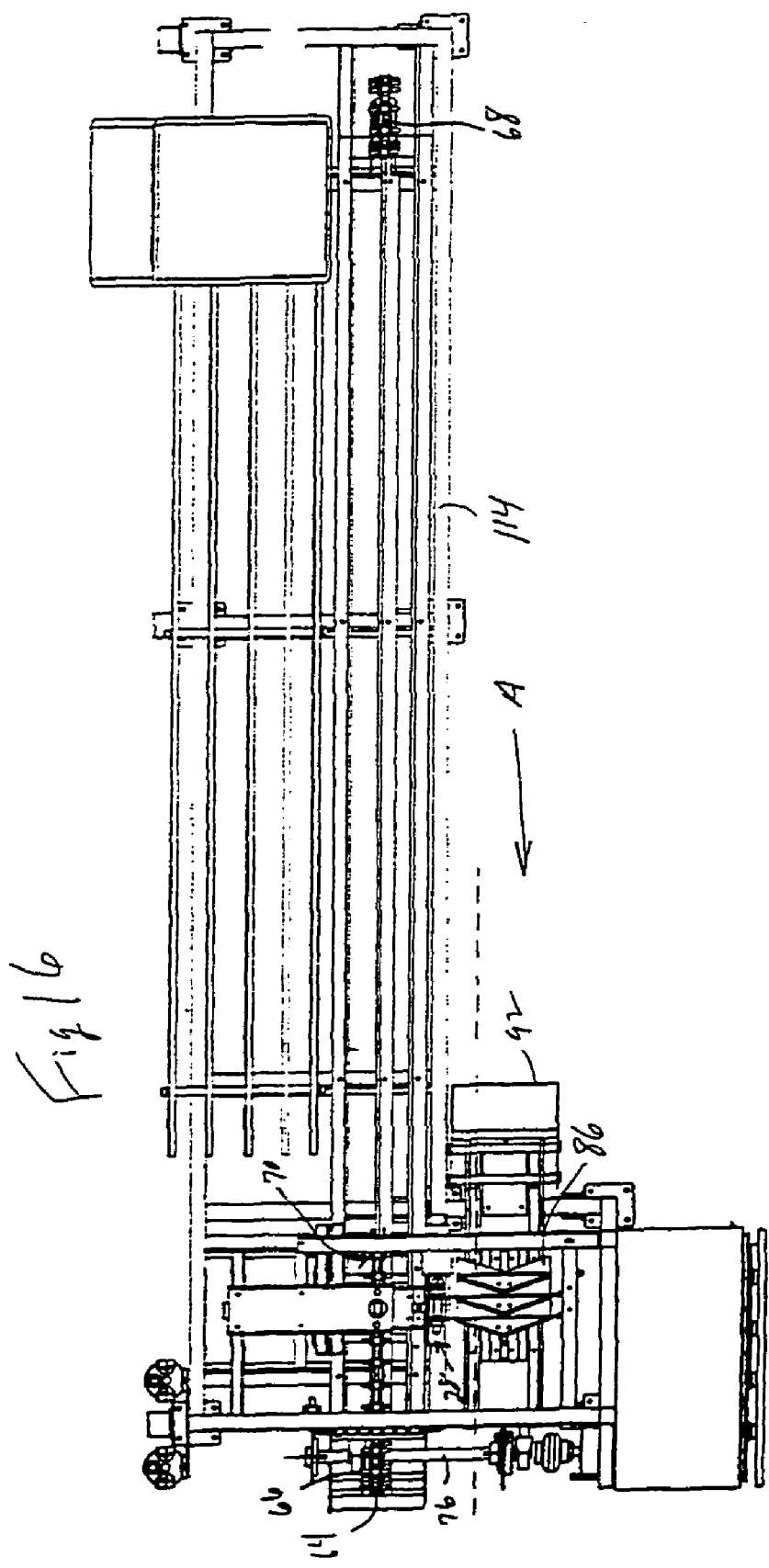

KEBAB MACHINE

CROSS REFERENCE TO RELATED APPLICATIONS

This application is a continuation-in-part of application Ser. No. 09/880,697 filed Jun. 13, 2001, now abandoned which is a continuation-in-part of application Ser. No. 09/427,319 filed Oct. 26, 1999 now abandoned.

TECHNICAL FIELD OF THE INVENTION

This invention relates to a food producing machine, and particularly to a machine to create a kebab.

BACKGROUND OF THE INVENTION

A kebab is generally understood to be a series of food items skewered on a stick which is then typically cooked over a stove or barbecue. The typical kebab includes meat, such as beef and chicken, vegetables such as onions, peppers and the like, and any other food items desired.

A significant and growing market is the production of kebabs within a mass production setting. The kebabs are then refrigerated or frozen and distributed to stores for sale to customers. Customers find these items to be very desirable as the customer need not purchase the particular food items, cut them to the desired shape and skewer them on a stick, but need only take the kebab from its appropriate packaging and begin the cooking processing. A need exists for an efficient and effective apparatus and method for producing these kebabs in a mass production environment.

SUMMARY OF THE INVENTION

In accordance with one aspect of the present invention, an apparatus is provided for preparing a food item. The apparatus includes a carrier which holds at least one food component spaced along a first direction. A carrier conveyor assembly conveys the carrier from an initial position to a predetermined position. An insertion device drives a stick in the first direction through the food component to create the food item when the carrier is in the predetermined position.

In accordance with another aspect of the present invention, a positioning device can be provided to position the stick at the insertion device for driving through the food component. A stick conveyor can be used to carry the stick from a storage position to a position proximate the positioning device. The positioning device can include an air jet to drive the stick into the insertion device. A pair of insertion drives can be utilized side by side to insert a pair of sticks into a pair of side by side carriers.

In accordance with another aspect of the present invention, a method is provided for preparing a food item including the steps of conveying a carrier holding at least one food component spaced along a first direction. The carrier is moved from an initial position to a predetermined position. The method includes driving a stick in the first direction by an insertion drive through the food component to create the food item when the carrier is in the predetermined position. The method can include the step of positioning the stick proximate the insertion drive with a positioning device and the step of conveying the stick from a stick storage position to a position proximate the positioning device.

BRIEF DESCRIPTION OF THE DRAWINGS

For a more complete understanding of the present invention and the advantages thereof, reference is now made to the following description taken in conjunction with the accompanying drawings, in which:

FIG. 10 is an end view of the carrier with the top thereon;

FIG. 11A is a perspective view of the stick driving device of the first embodiment;

FIG. 11B is a perspective view of the stick driving device of the first embodiment illustrating the fiber optic sensor;

FIG. 11C is a perspective view of the stick driving device of the first embodiment illustrating the fiber optic sensor with a stick breaking the beam path;

FIG. 12 is an exploded view of the stick driving device of FIG. 11;

FIGS. 13a, 13b and 13c illustrate the process of driving the stick into the food components;

FIG. 14 is a perspective view of a flight of the stick conveyor;

FIG. 15 is a plan view of the flight;

FIG. 16 is a plan view of the first embodiment;

DETAILED DESCRIPTION OF THE INVENTION

Figure 1:
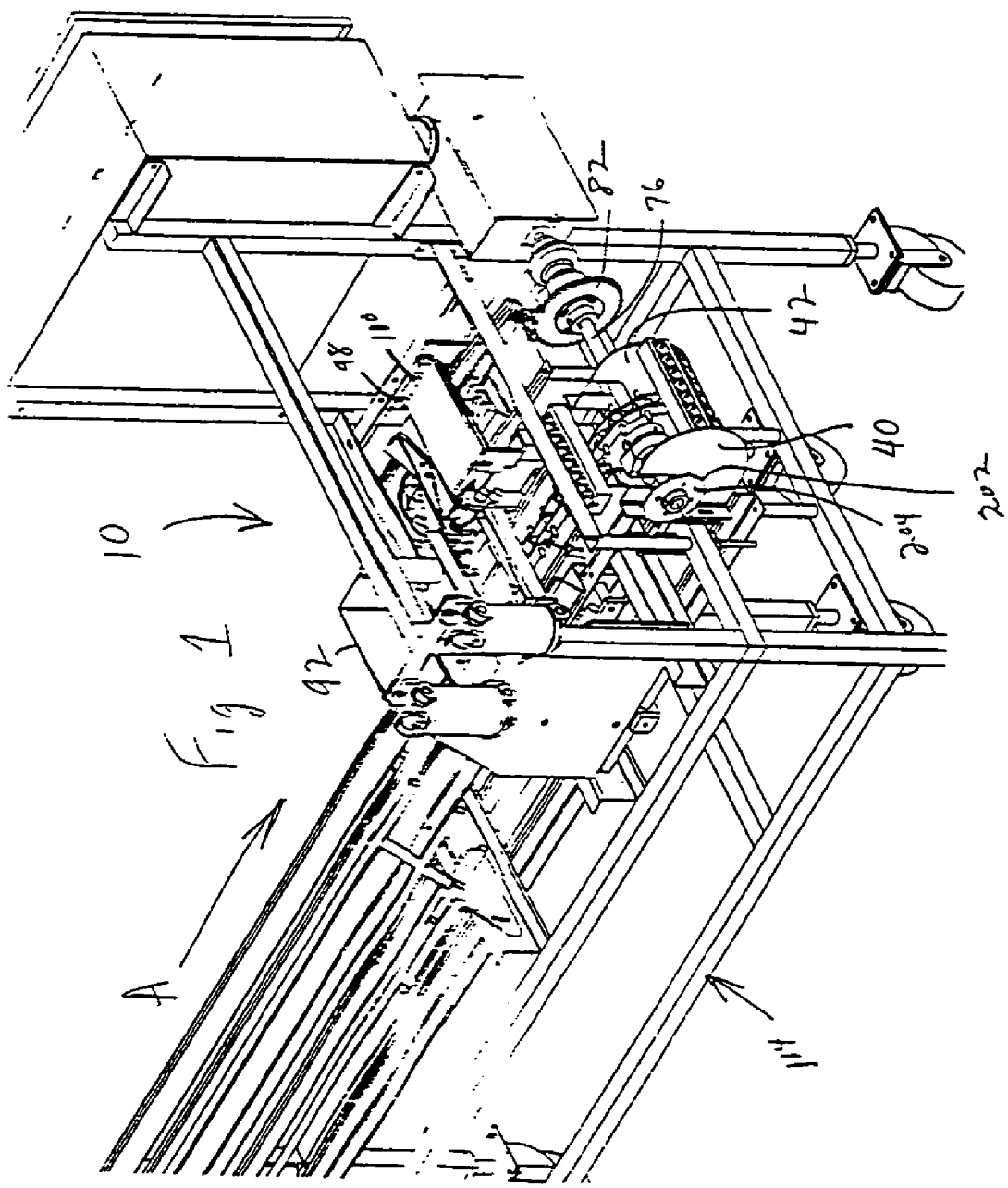
FIG. 1 is a front perspective view of a portion of a first embodiment of the present invention.

With reference now to the figures, a kebab machine 10 will be described. The kebab machine will, as described hereinafter, insert a stick 12 into various food components 14a-g held in a carrier 16 to form a kebab. The food components can be precooked, or raw, as desired. Further, stick 12 should be interpreted to include a common wooden kebab stick, a rod, a spear or any other similar linear skewering device.

With reference to FIGS. 1-3 and 13, the basic operation of the kebab machine 10 moves a side by side pair of carriers 16 carried along a carrier conveyor chain 18 in direction A to a predetermined position 20 while a stick conveyor 22 simultaneously positions a pair of sticks 12 side by side in direction A proximate the predetermined position. An adjacent pair of air jets 98 and 100 each discharge a blast of air, impacting the ends 102 of the sticks 12 and driving them in direction B into an insertion device 28 which has a spaced pair of mating drive rollers 158 which catch the sticks and drive the sticks further in direction B into the food components 14*a-g* in the adjacent carrier 16. The insertion device 28 is mounted for limited motion in the direction of insertion B to facilitate release of the sticks after they have been inserted in the food components and to prevent interference of movement of the carriers with the sticks inserted therethrough from the predetermined position 20. The skewered food items are removed from their associated carrier as the carrier conveyor chain 18 continues its motion by engagement of the ends of the stick by a pair of cam plates 40 and 42 which discharge the kebab from the carrier 16.

Having described the general operation of the machine 10, specific details will now be described.

Figure 4:
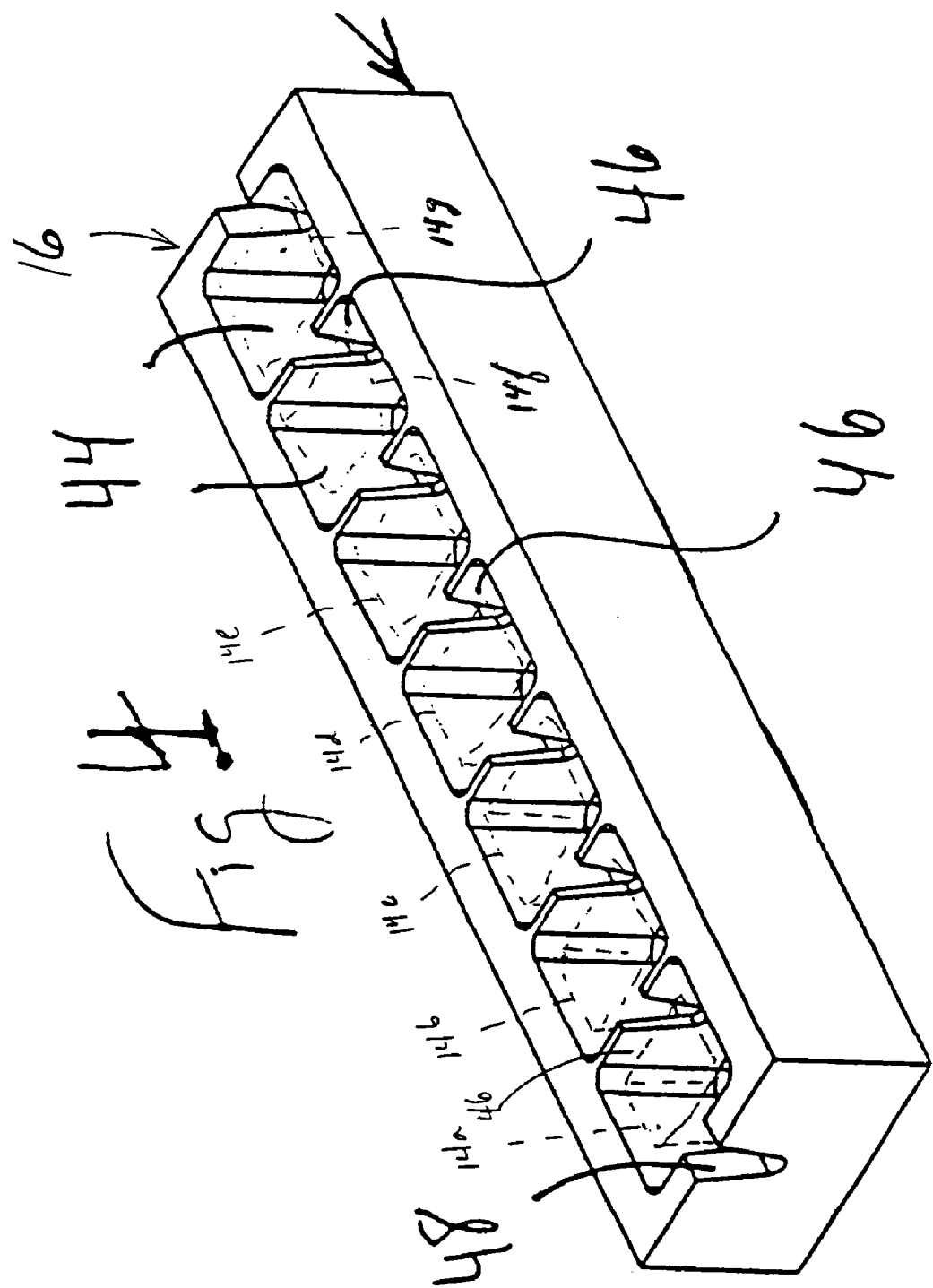
FIG. 4 is a perspective view of a carrier utilized in the first embodiment.
Figure 5:
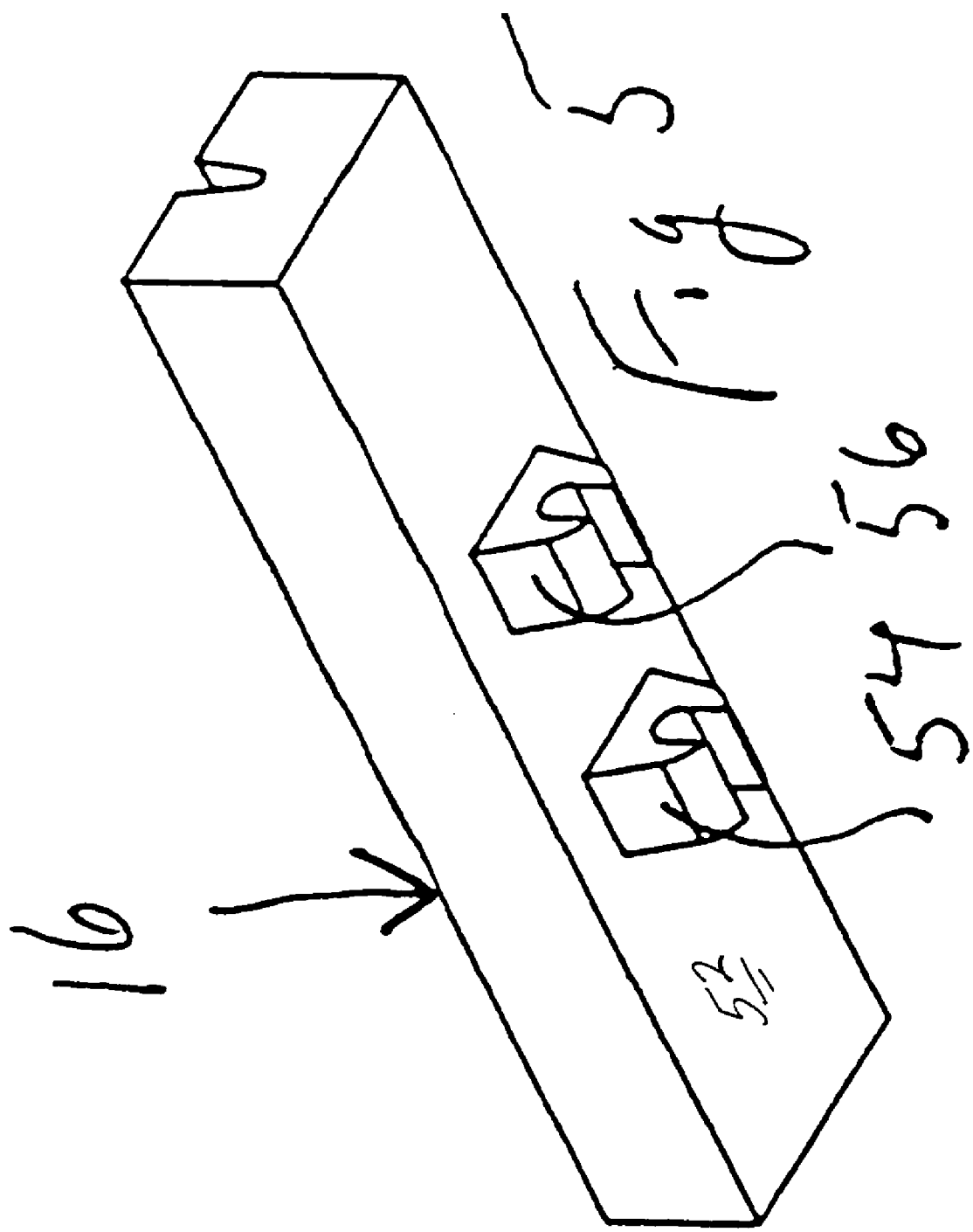
FIG. 5 is a perspective view of the carrier of FIG. 4 from beneath the carrier portion.
Figure 6:
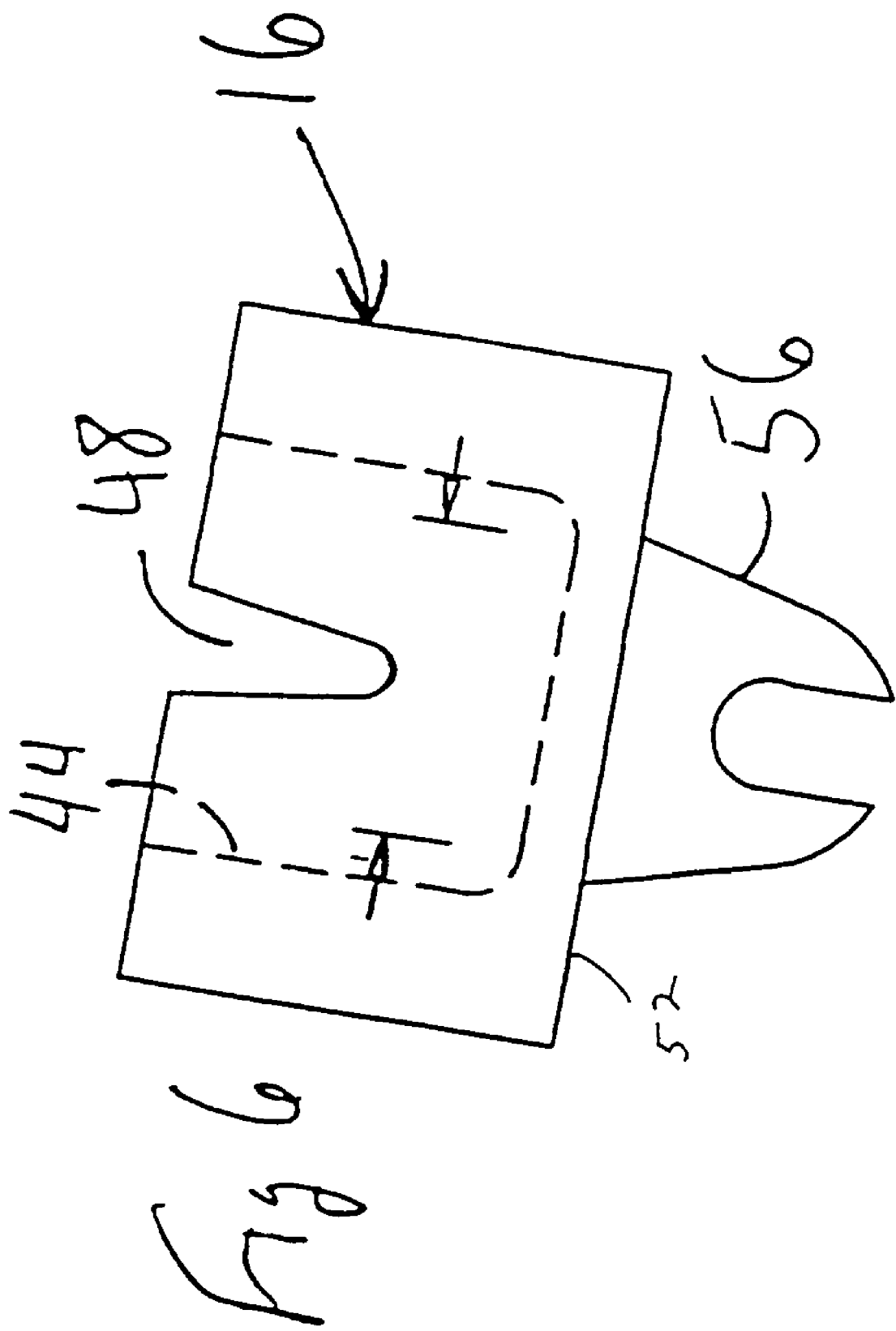
FIG. 6 is an end view of the carrier portion of FIG. 4.

With reference to FIGS. 4-6, the carrier 16 can be seen to comprise a container having a plurality of individual compartments 44 which are separated by barriers 46. While seven compartments are shown to hold the seven food components 14*a-g*, any number of compartments and food components can be used. Each barrier has a V-shaped notch 48 formed therein which are aligned along the elongate length of the carrier 16. The individual food components 14*a-g* are each placed in one of the compartments 44 so that they are spaced along the elongate length.

From the bottom 52 of the carrier extends two extensions 54 and 56 which snap fit onto the carrier conveyor chain 18 in a manner described hereinafter.

Figure 7:
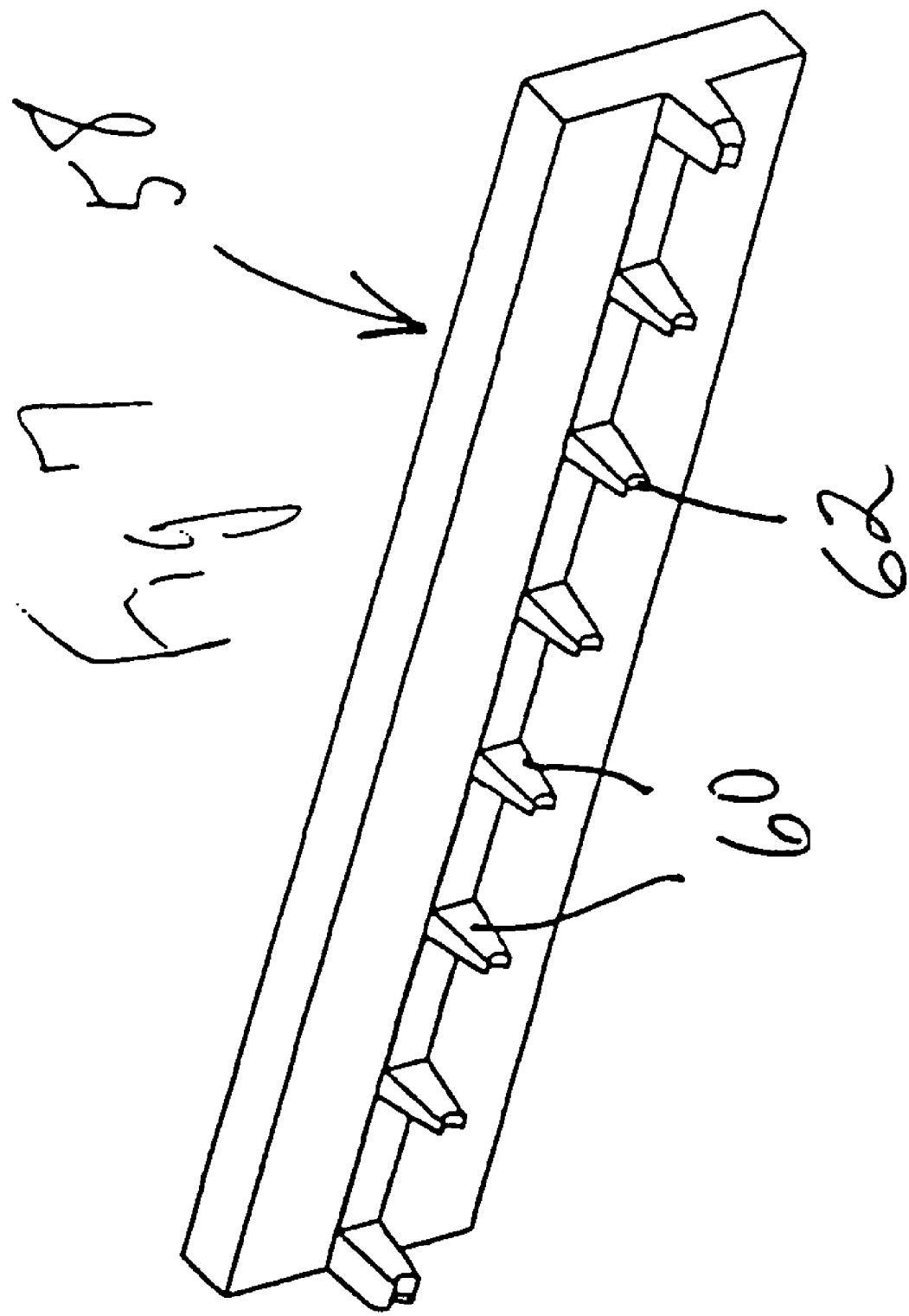
FIG. 7 is a perspective view of a top for the carrier.
Figure 8:
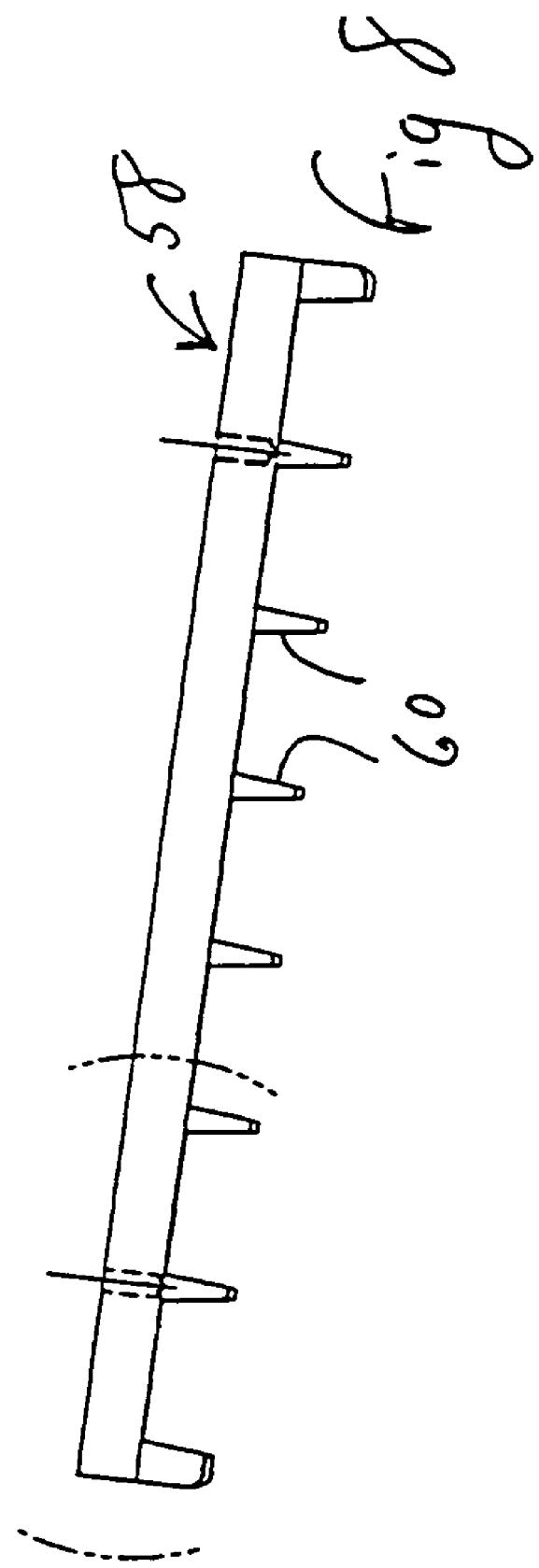
FIG. 8 is a side view of the top.
Figure 9:
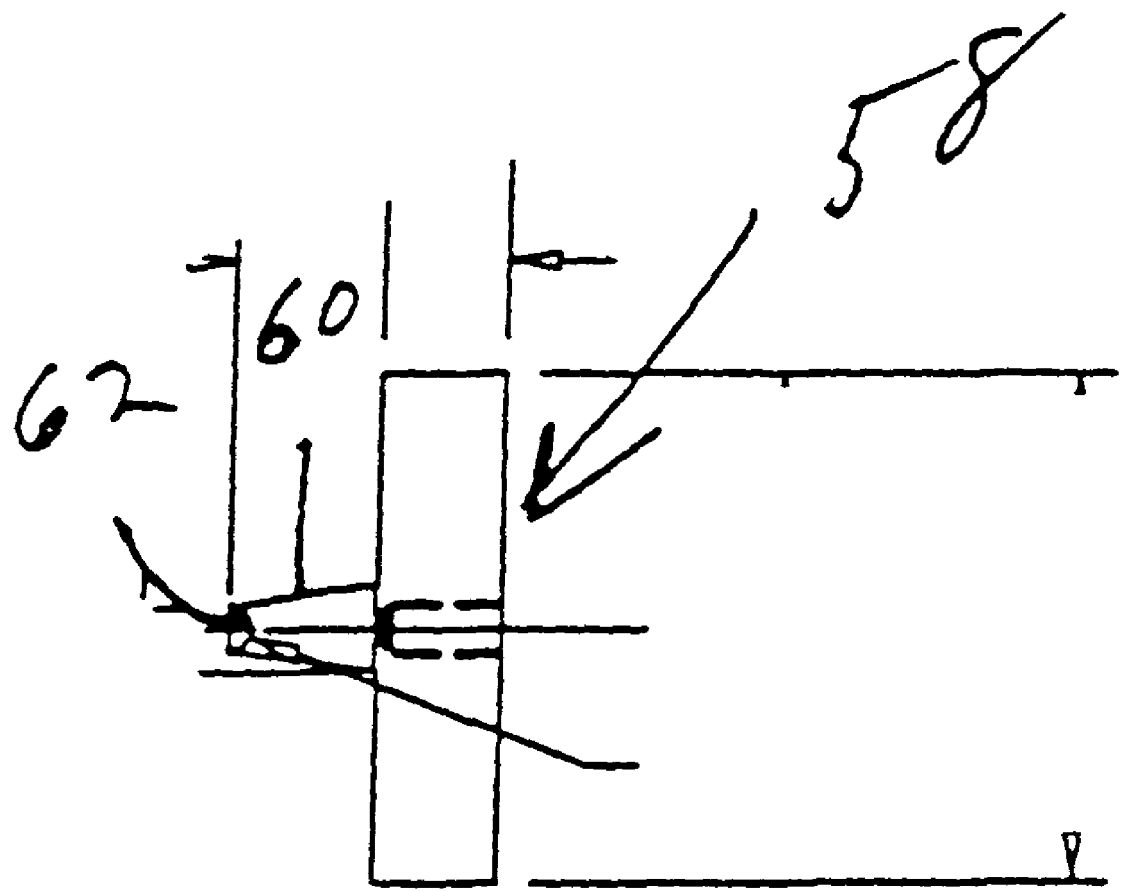
FIG. 9 is an end view of the top.

With reference to FIGS. 7-9, a top 58 used with the carrier 16 is illustrated. The top 58 has a series of V-shaped extensions 60 which fit into the V-shaped notches 48 when the top is placed on the carrier 16, as seen in FIG. 10. The end of each extension 60 has a semi-cylindrical end surface 62 as shown. The bottom of the V-shaped notch 48 and the surface 62 define a circular aperture through each barrier 46 for passage of the stick through the food components as will be described hereinafter. The top is mated with carrier 16 in the predetermined position by lowering a presser foot 190 during the skewering process. Two tops 58 are secured to presser foot 190.

Preferably, both the carrier 16 and top 58 are formed of a food grade material. For example, a glass filled Teflon (polytetrafluoroethylene) such as Delrin can be used. Alternatively, the carrier 16 and top 58 can be made of stainless steel, other metals, other plastics, ceramics or even wood, as examples.

Figure 2:
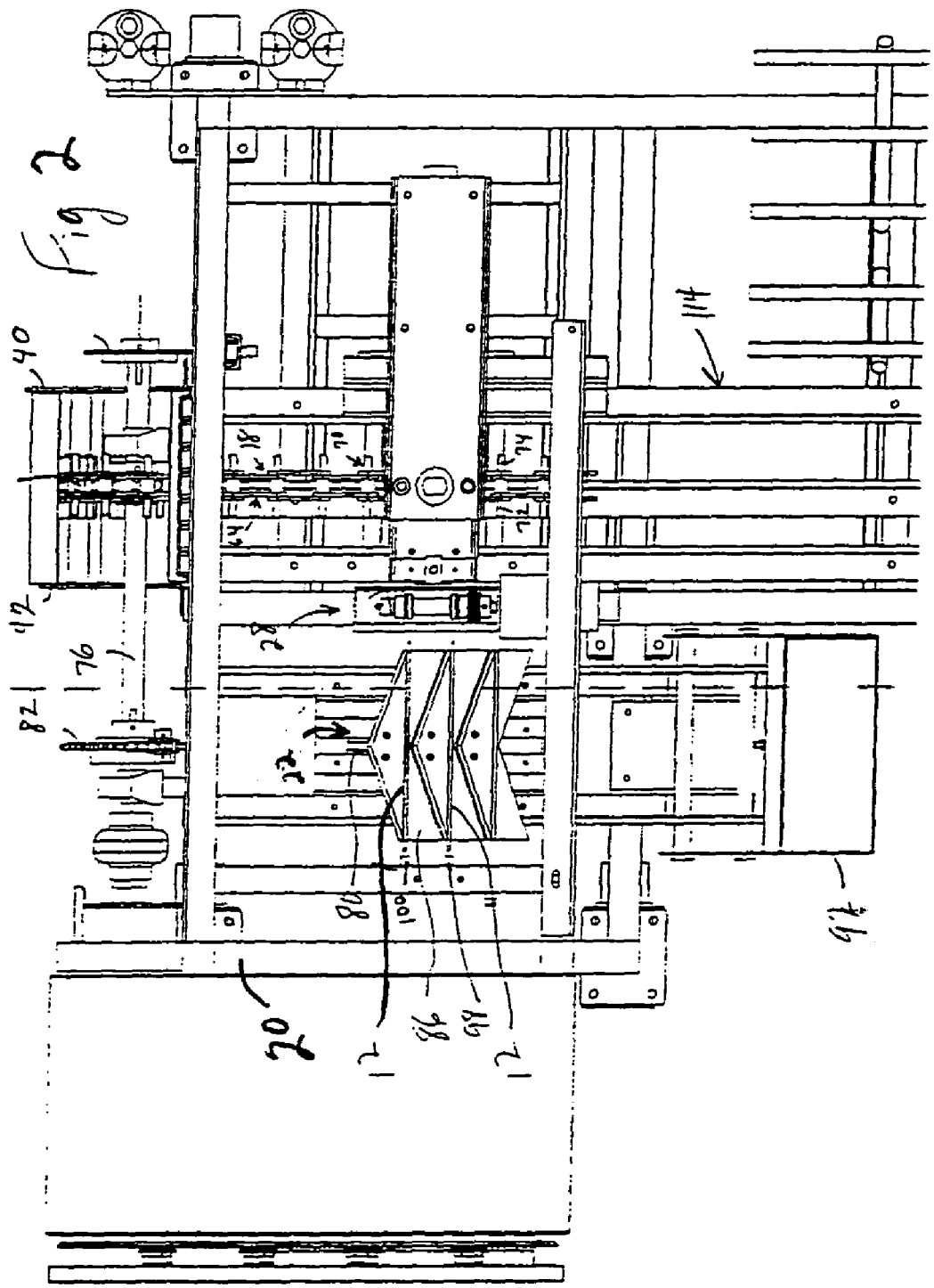
FIG. 2 is a plan view of a portion of the first embodiment.
Figure 3:
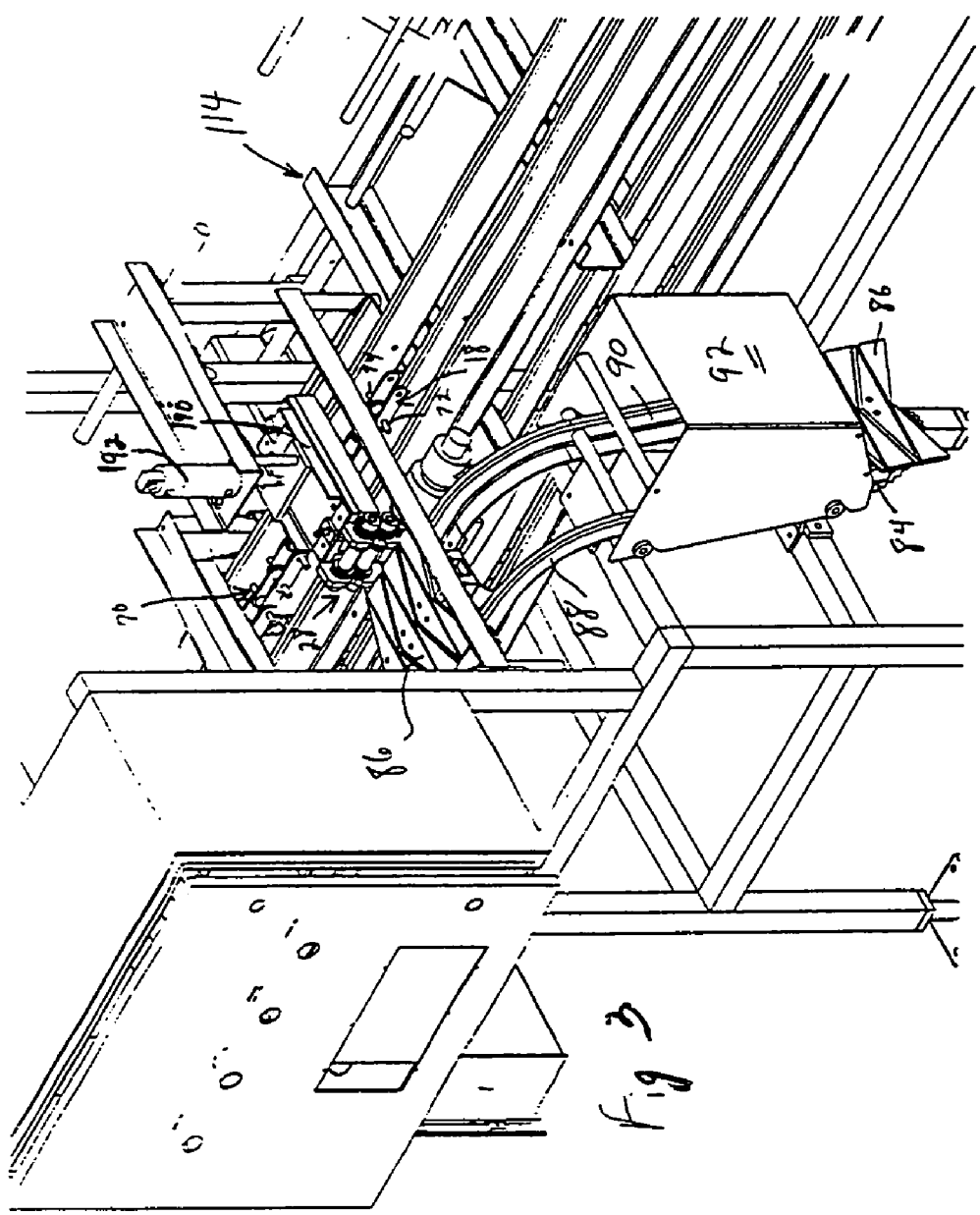
FIG. 3 is a rear perspective view of a portion of the first embodiment.

With reference now to FIGS. 2, 3 and 16, the carrier conveyor chain 18 can be seen to comprise a continuous chain 64 extending between a front driving sprocket 66 and a rear idler sprocket 68. Each link in the chain 64 has a pin 70 which extends transverse the direction of motion A of the upper side of the chain conveyor belt 18. Each pin 70 has a portion 72 on one side of the chain and a portion 74 on the other side of the chain. The extensions 54 and 56 on carriers 16 snap fit over portions 72 and 74, respectively, to secure the carrier 16 to the carrier conveyor chain 18 for movement therewith. Typically, an operator at the rear of the machine will either place a carrier 16, with the food components therein, on a free pin 70 for movement from the rear of the machine toward the front or fill the empty compartments in a carrier 16 already on the conveyor chain 18. The conveyor chain 18 can be driven by any suitable device, and is seen to be driven by a drive shaft 76 by a stepping motor, not shown.

With reference now to FIGS. 2, 3, 14 and 15, the stick conveyor 22 will be described. The stick conveyor also includes a chain 80 which extends around a driving sprocket 82 and an idler sprocket 84. Individual stick flights 86 are positioned along the chain and bolted thereto. Guide rails 88 and 90 guide the stick flights, and thus the chain, on a path past a stick storage bin 92 to the predetermined position 20 for insertion of the sticks within the food components. As seen, the flights 86 will move in a direction angled from vertical past an open side of the storage bin 92. The flights effectively form one side wall of storage bin 92. Stick grooves 96 in each flight 86 are shaped so that a stick will be picked up from the storage bin 92 and carried by the flight to the predetermined position 20. Preferably, the stick conveyor 22 is driven by the same motor and drive shaft 76 that drives the carrier conveyor chain 18 so that the motion of the carrier conveyor chain 18 and the stick conveyor 22 are synchronized.

With reference to FIGS. 1-3 and 11-13, the operation of the insertion device 28 will be described. The kebab machine 10 positions a pair of carriers 16 with food components therein at the predetermined position 20 at the same time that the stick conveyor 22 positions a pair of flights 86 at the predetermined position, each flight containing a stick 12. In the predetermined position, a pair of air jets 98 and 100 are positioned proximate the ends 102 of the sticks which face away from the carriers 16. Typically, end 102 will be a planar surface, but it can also be pointed, if desired. The machine 10 will control a jet of air discharged from the air jets 98 and 100 onto the ends 102 of the sticks to drive the sticks forward in direction B into the insertion device 28.

The insertion device 28 includes plates 110 and 112 which are rigidly mounted on the frame 114 of the machine 10. Shafts 116 and 118 pass through holes 120 formed in the plates 110 and 112 and are guided by bearings 122 for motion in direction B. One end of each of the shafts 116 and 118 is mounted on a plate 126, while the other ends of the shafts are mounted to an angle 128. A motor mount assembly 130 is mounted on angle 128 and a motor 132 is mounted on the assembly 130. An air cylinder 134 is mounted at its end to the frame 114 while the end of the piston 136 of the air cylinder 134 is mounted to the plate 126. Brackets 138 and 140 extend vertically upward from the assembly 130 and are providing with aligned pairs of holes 142 and 144.

Figure 17:
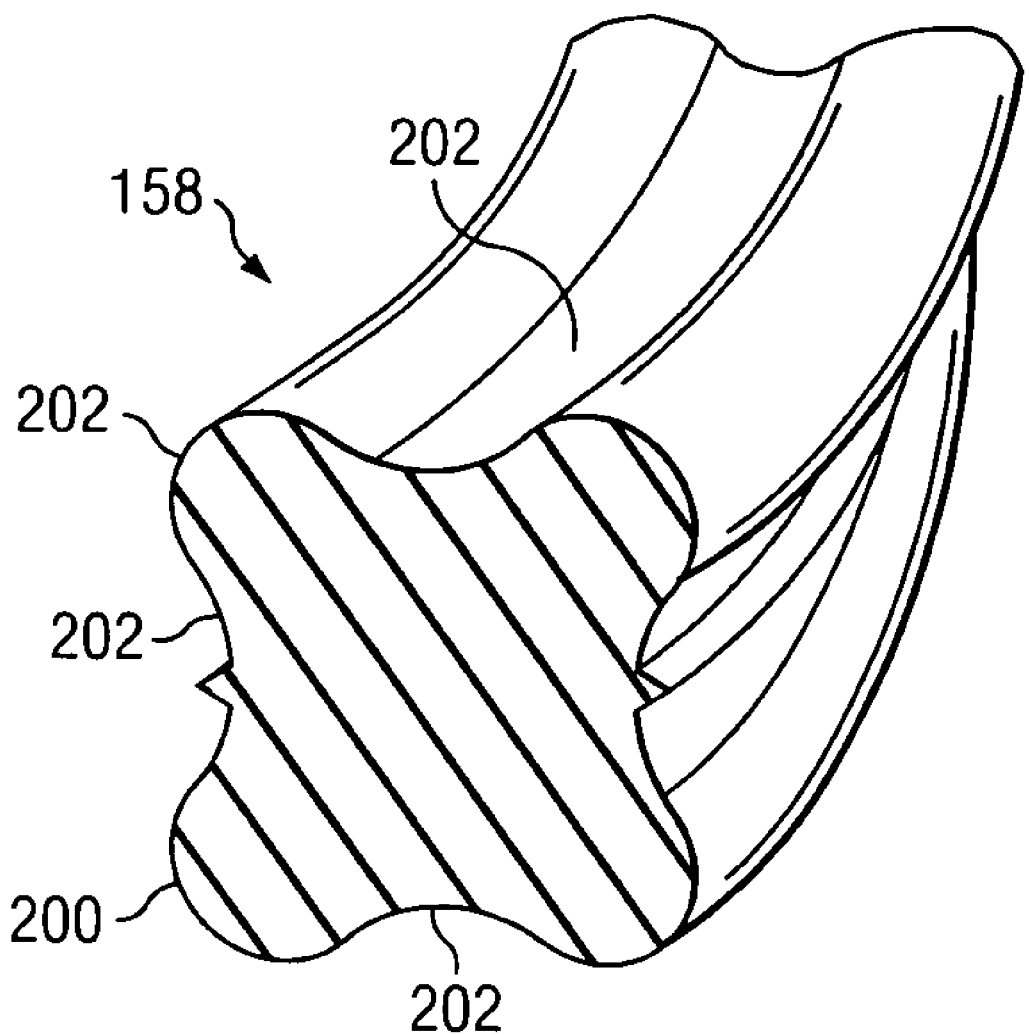
FIG. 17 is an illustrative view of a Quad Ring® seal utilized in the present invention.

A shaft 146 is received in aligned holes 142 and has at one end a gear 148 mounted thereon. Bearings 150 support the shaft 146 for rotational motion in the holes 142. As best seen in FIG. 12, the shaft 146 has separate pairs of grooves 152 for receiving snap rings 154. Between each adjacent pair of snap rings 154 are washers 156 and a resilient four lobe seal ring 158, such as sold by Minnesota Rubber and QMR Plastics, 3630 Wooddale Avenue, Minneapolis, Minn. 55416, as the Quad Ring® seal. With reference to FIG. 17, the four lobe seal ring 158 can be seen to include four sealing lobes 200 and four generally V-shaped grooves 202 between each adjacent pair of sealing lobes 200. By varying the thickness or number of washers 156, the compression of seal ring 158 between the snap rings can be varied, which changes the configuration of the grooves 202. With a pair of seal rings 158 close to each other and properly compressed by the snap rings, a stick 12 will be caught in the facing V-shaped grooves 202 at the radially outer surface 204 of the mating seal rings 158 to tightly grip the stick 12 there between.

Similarly, a shaft 160 is supported for rotation in the holes 144 and mounts a gear 162 on the end thereof. Gears 148 and 162 are meshed together and gear 162 also meshes with the drive gear 164 on the shaft of the motor 132.

The adjacent resilient seal rings 158 on shafts 146 and 160 are sufficiently squeezed toward each other, as noted previously, to form a nip 166 therebetween to receive a stick 12 between facing grooves 202. By rotating the motor 132 in the correct direction, the shafts 146 and 160 are rotated in the direction of arrows C to drive a stick 12 inserted between contacting seal rings 158 in the insertion direction B and through the food components 14a-g in the adjacent carrier 16. Air cylinder 134 drives the insertion device 28 sufficiently close to the adjacent carrier 16 to allow the sticks to be driven into the adjacent carrier 16 with considerable force to skewer the food components without snapping the stick 12. The circular aperture defined between extensions 60 of top 58 and V-shaped notches 48 in carrier 16 support the stick 12 as it is driven through the food components as well. The degree of frictional engagement between the stick 12 and the seal rings 158 can be varied by varying the thickness or quantity of the washers 156, as noted above. Seal rings 158 are preferably of a suitable flexible material, such as food grade silicon rubber.

As can be appreciated, as seen in FIG. 13a, the air jets 98 and 100 blow the sticks 12 in the predetermined position in direction B into the nips 166 between adjacent seal rings. The seal rings are rotated by the motor 132 so that the front point 170 of each stick is caught by the nip 166 between the seal rings 158 and the stick is then driven in the insertion direction into the carrier and through the food components.

After the stick has been driven through the insertion device 28, the air cylinder 134 is activated to move the shafts 116, 118, angle 128, brackets 138 and 140 and structure supported thereon away from the carriers 16 to permit the carriers to move in the direction A for subsequent removal of the kebab from the carriers. The sticks usually extend ¼" to ¾" outside the ends of the carrier 16 after skewering.

With reference to FIGS. 11B and 11C, a fiber optic sensor 300 can be used to insure proper stick insertion before the carriers 16 are moved in direction A. The fiber optic sensor 300 includes a light transmitter 302 and a light sensor 304. The light transmitter 302 is mounted in bracket 138 while the light sensor 304 is mounted in bracket 140. The light transmitter 302 directs a beam of light toward the light sensor 304 which intersects the path of both sticks 12 being inserted by the insertion device 28. When the sticks are properly inserted, the ends 102 of the sticks have passed the light beam from the light transmitter 302 and the beam thus falls on the light sensor 304. This provides a signal to the control system of the kebab machine 10 that the carrier 16 can be moved in direction A. However, if one or both of the sticks 12 being inserted into the carriers 16 have not been properly inserted by the insertion device 28, a portion of the stick or sticks improperly inserted will lie in the path of the light beam from transmitter 302 and will block the light beam from falling on the light sensor 304. If the carrier 16 were to move in direction A in such a condition, the end of the stick or sticks 12 would interfere with the insertion device 28, usually causing the stick or sticks to break. When the presence of a stick is detected, the control system of the kebab machine 10 will conclude an improper insertion has occurred. Preferably, the control system will cause the insertion device 28 to repeat the insertion steps to insert the sticks 12 once or twice more in an effort to achieve proper insertion. If proper insertion is still not sensed by the fiber optic sensor 300 after the chosen number of reinsertion attempts, the control system can halt operation of the kebab machine and attention of the machine operator will be required.

During the insertion process, a presser foot 190 is actuated downward by an air cylinder 192 to insert and hold the tops on the carriers 16 to prevent motion of the food components 14a-g as they are skewered by the sticks. After skewering, the presser foot 190 is lifted by air cylinder 192 or a spring.

As the carriers 16 are carried forward on the carrier conveyor belt 18 in direction A after sticks 12 have been inserted, the ends of each stick come into engagement with the surfaces 194 on cam plates 40 and 42 which drive the stick and skewered food components 14a-g out of the carrier and into a suitable receptacle for further processing.

As can be understood, an efficient apparatus and method for preparing a kebab is disclosed. The flights 86 can be readily removed and replaced by flights designed for carrying another size stick, if desired. A cover, preferably clear Lexan, can cover the operation of the stick insertion for safety reasons, if desired.

The rotation of the drive shaft 75 for the driving sprockets 66 and 82 of the carrier conveyor belt 18 and stick conveyor 22 can be driven by a stepper motor. The stepper motor can be controlled by a sensor sensing the individual points 202 on a control wheel 204 illustrated in FIG. 1 also rotated by shaft 75. The length of the sticks 12 is not critical to the operation of the machine as the air jets will blow the sticks in direction B regardless of length into the nips 166 of the insertion device 28. While two sticks are illustrated as being inserted simultaneously, four or any other number can be inserted by simply increasing the number of positions in the insertion device 28.

Figure 18:
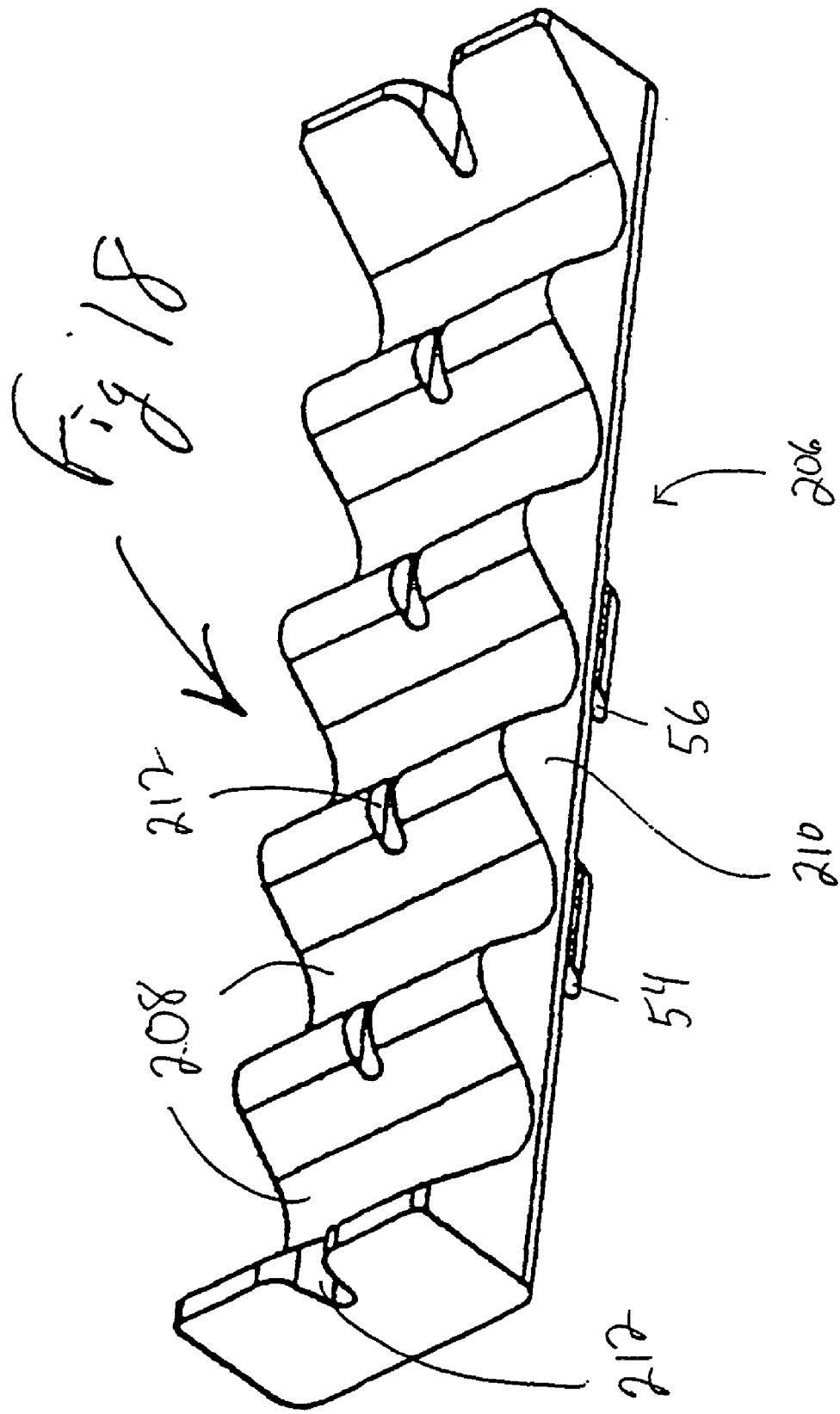
FIG. 18 is a perspective view of a first modified carrier utilized in a first embodiment.
Figure 19:
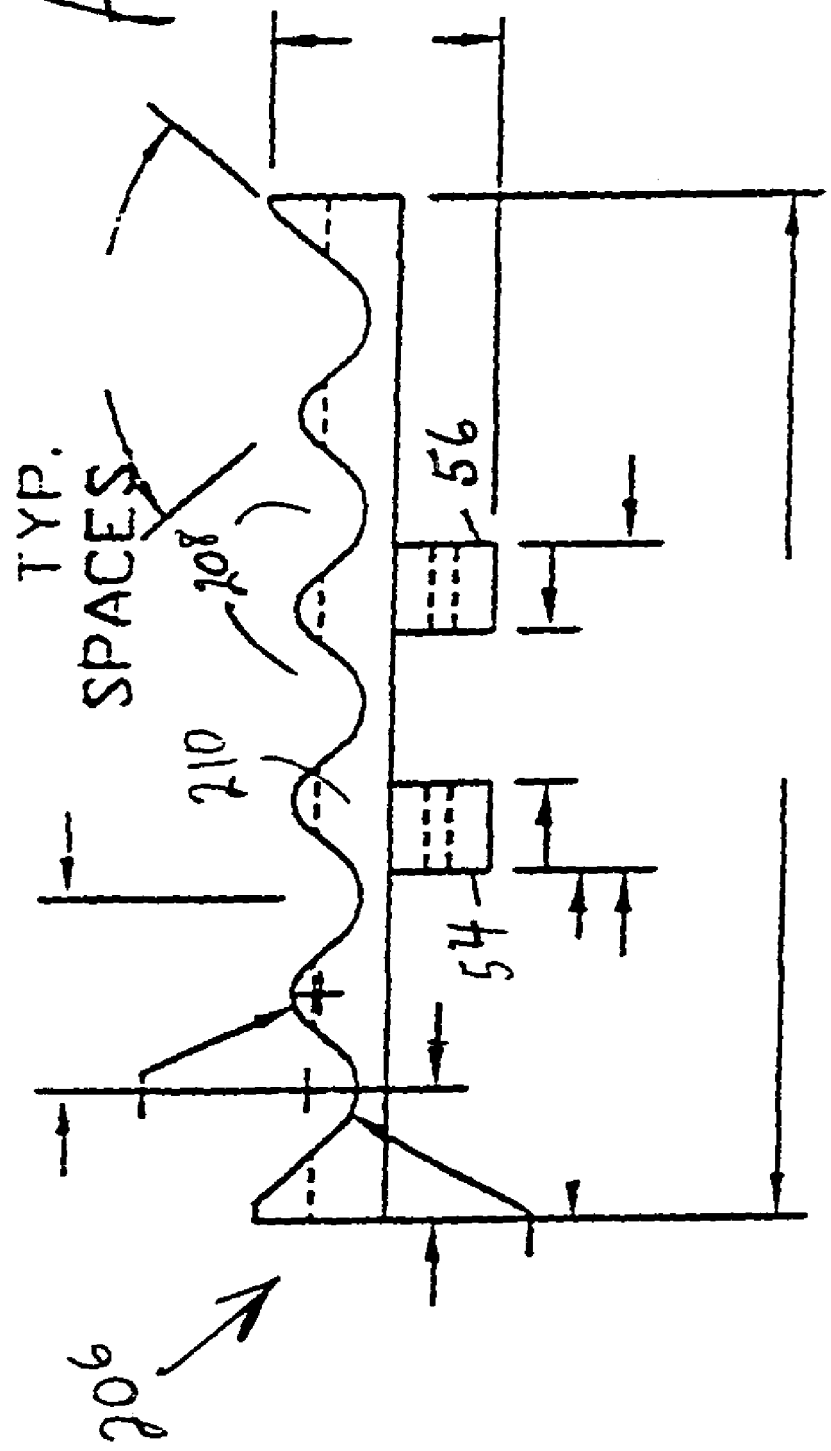
FIG. 19 is a side view of the first modified carrier.
Figure 20:
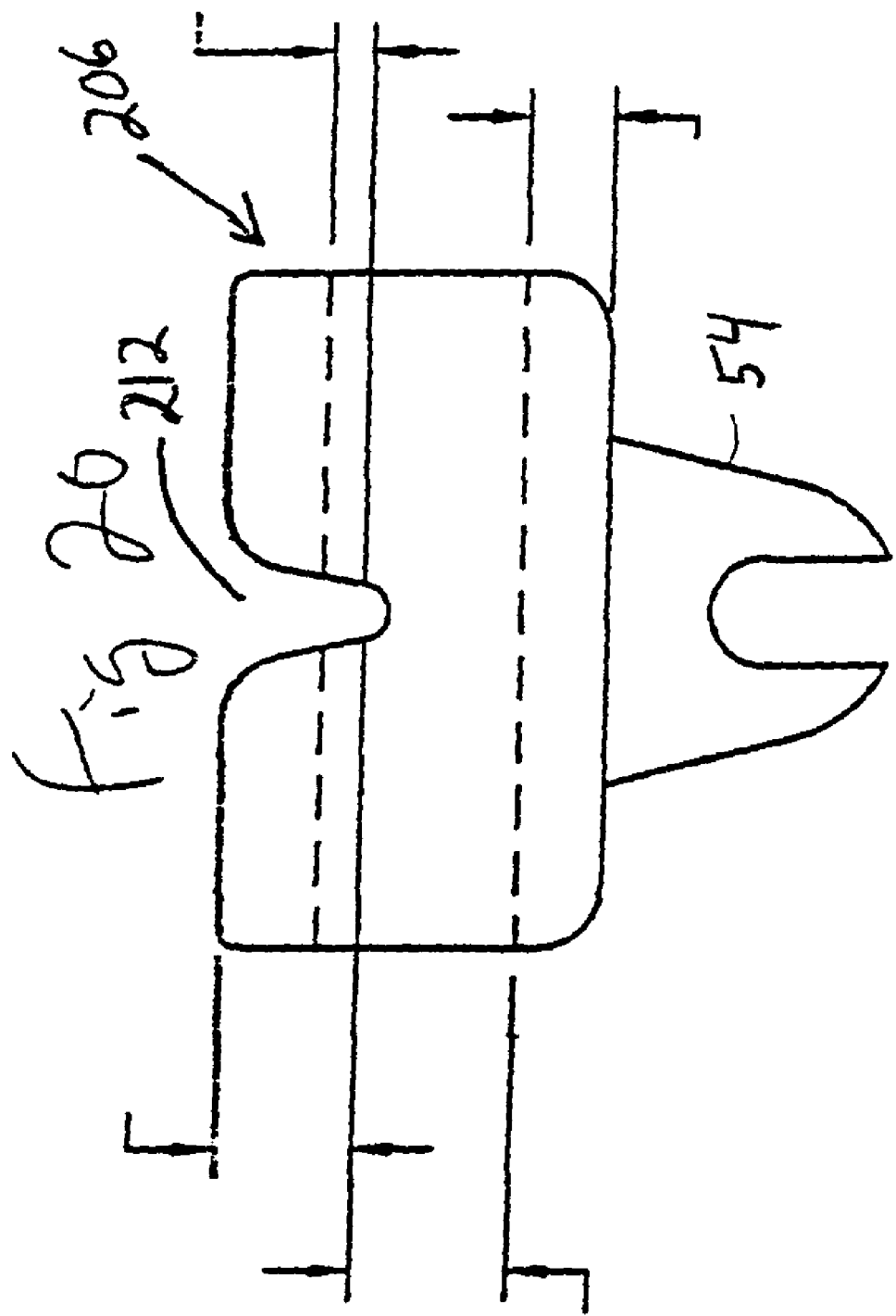
FIG. 20 is an end view of the first modified carrier.

With reference now to FIGS. 18-20, a first modified carrier 206 will be described. The first modified carrier 206 has a series of curved depressions 208 for receiving the food items. The depressions 208 are open at the sides 210 of the carrier 206 to receive elongate food items. Notches 212 permit passage of stick 12 through the carrier 206.

As carrier 16, the carrier 206 has extensions 54 and 56 to snap fit onto the carrier conveyor chain 18.

Figure 21:
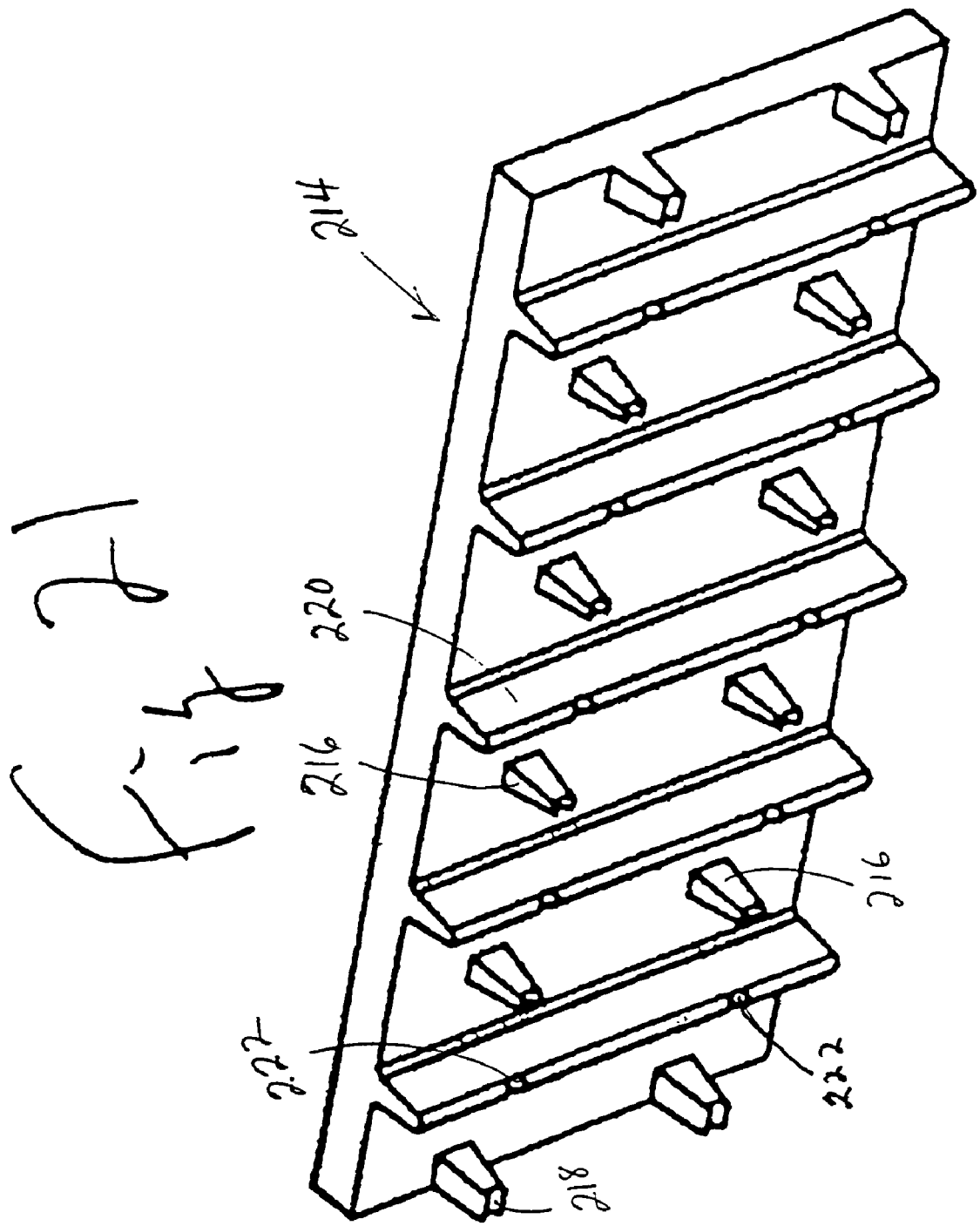
FIG. 21 is a perspective view of a presser foot utilized with the first modified carrier.
Figure 22:
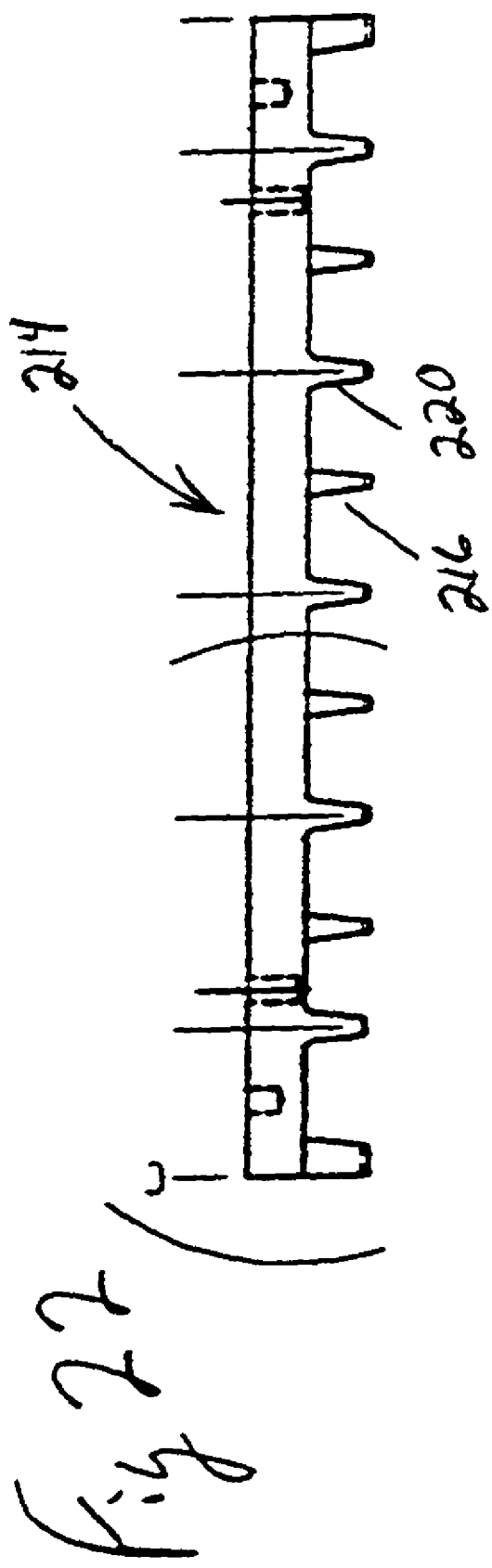
FIG. 22 is a side view of the presser foot of FIG. 21.

With reference now to FIGS. 21 and 22, there is illustrated a presser foot 214 which replaces the presser foot 190 when carriers 206 are utilized. As can be seen in the figures, the presser foot 214 has a dual set of V-shaped extensions 216 which extend downwardly and into the notches 212 when the presser foot 214 is pressed down on the side by side carriers 206 by the air cylinder 192. Thus, the single presser foot 214 serves the same function as a pair of tops 58. The extensions 216 also end in semi cylindrical end surface 218 which defines a circular aperture for passage of the stick 12. Also, presser foot 214 has a series of full width barriers 220 which extend into the curved depressions 208 to hold the food items therein. Each barrier has a pair of notches 222 to permit passage of the sticks 12.

Figure 23:
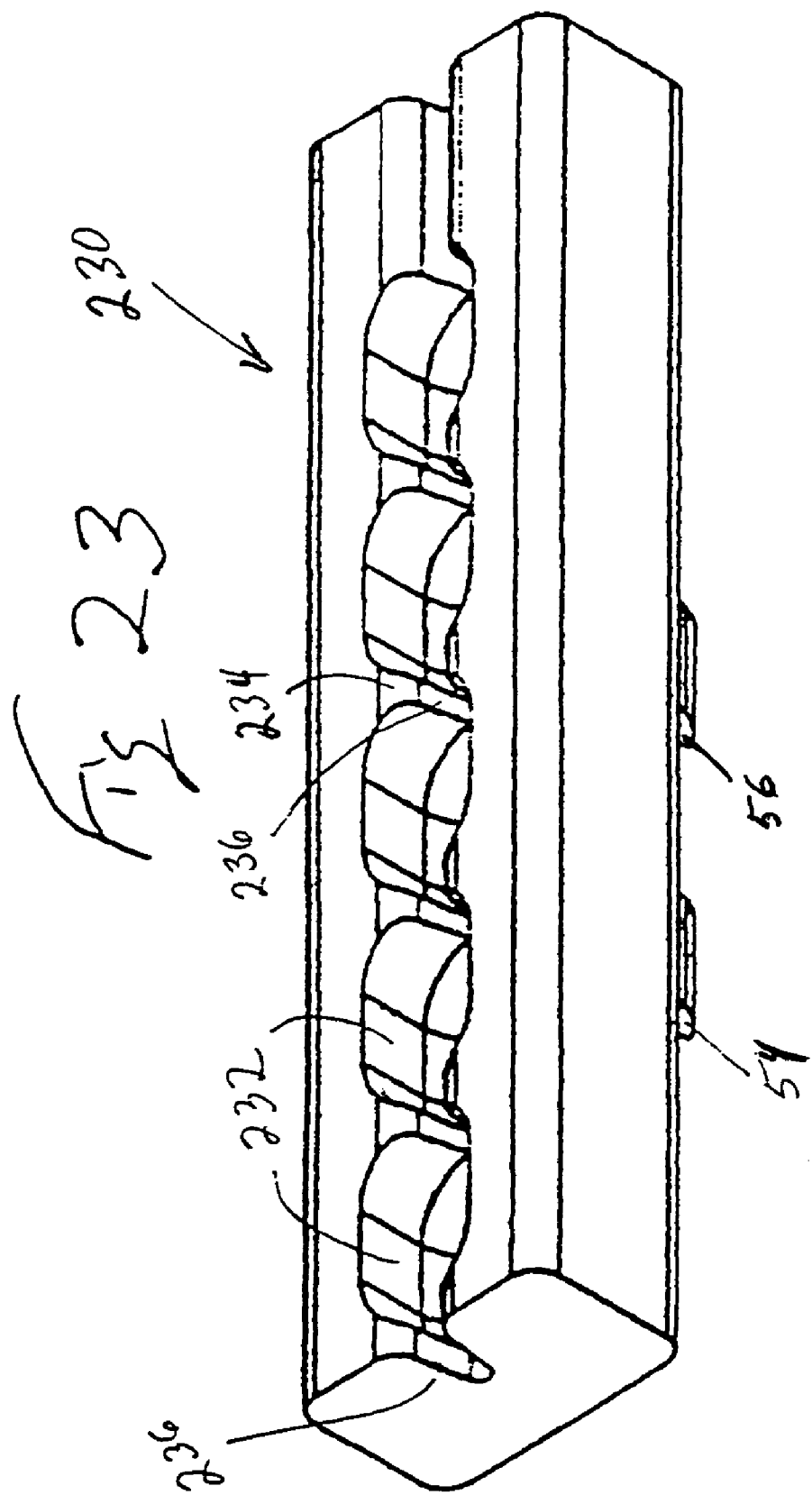
FIG. 23 is a perspective view of a second modified carrier utilized in the first embodiment.
Figure 24:
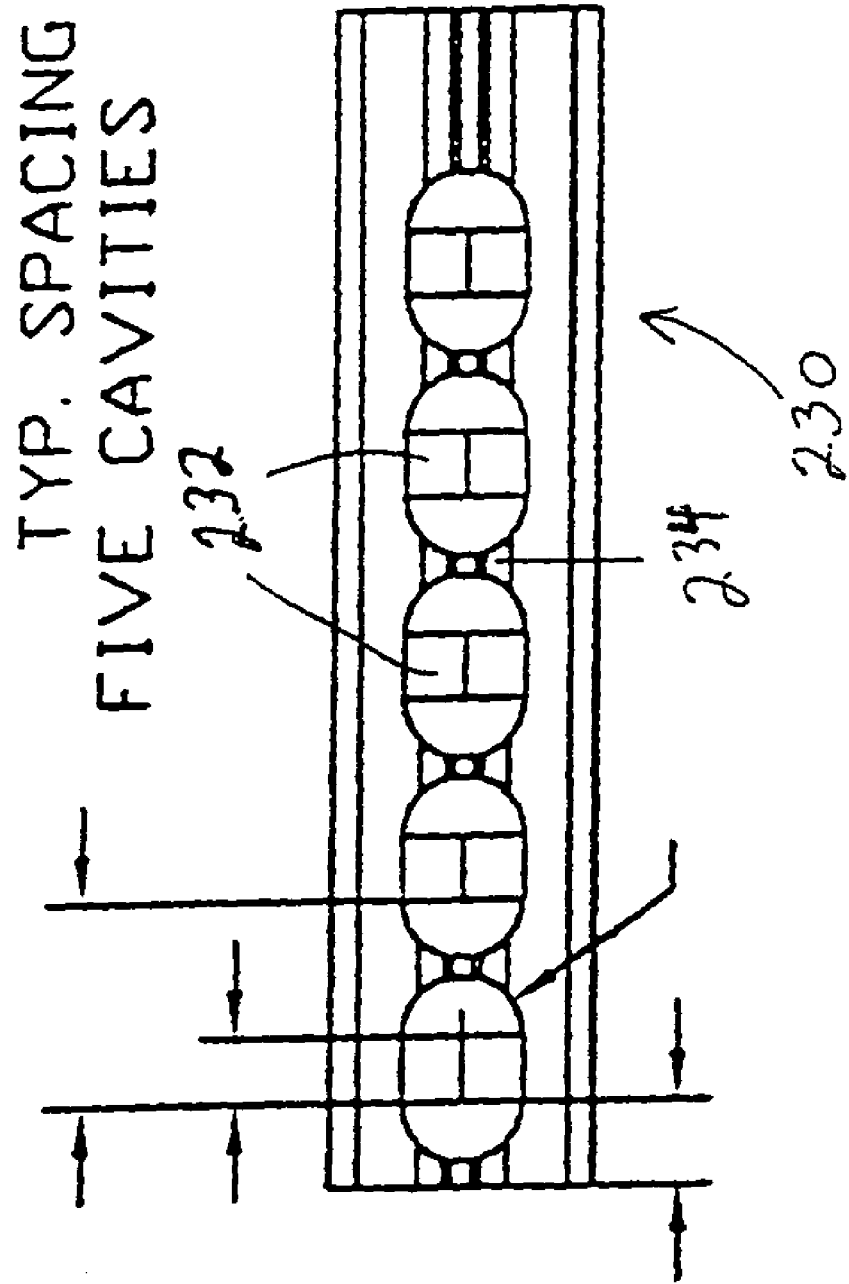
FIG. 24 is a top view of the second modified carrier.
Figure 25:
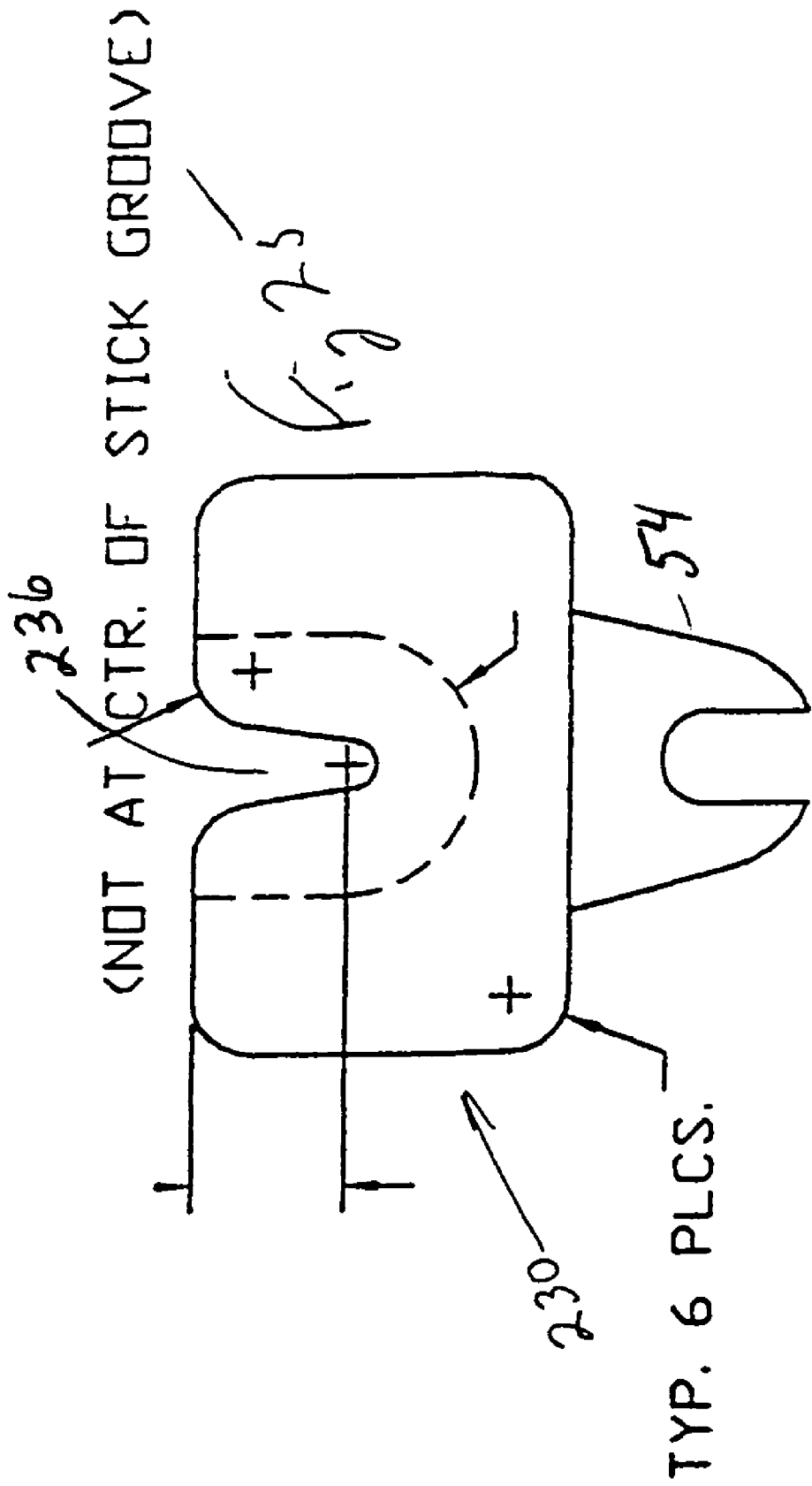
FIG. 25 is an end view of the second modified carrier.

With reference to FIGS. 23-25, a second modified carrier 230 will be described. The second modified carrier 230 is specifically adapted for forming a kebab of chocolate eggs or other egg-like candies due to the egg-shaped compartments 232 formed into the carrier 230. Barriers 234 separate each of the compartments 232 and have V-shaped notches 236 formed therein for passage of the sticks 12.

Figure 26:
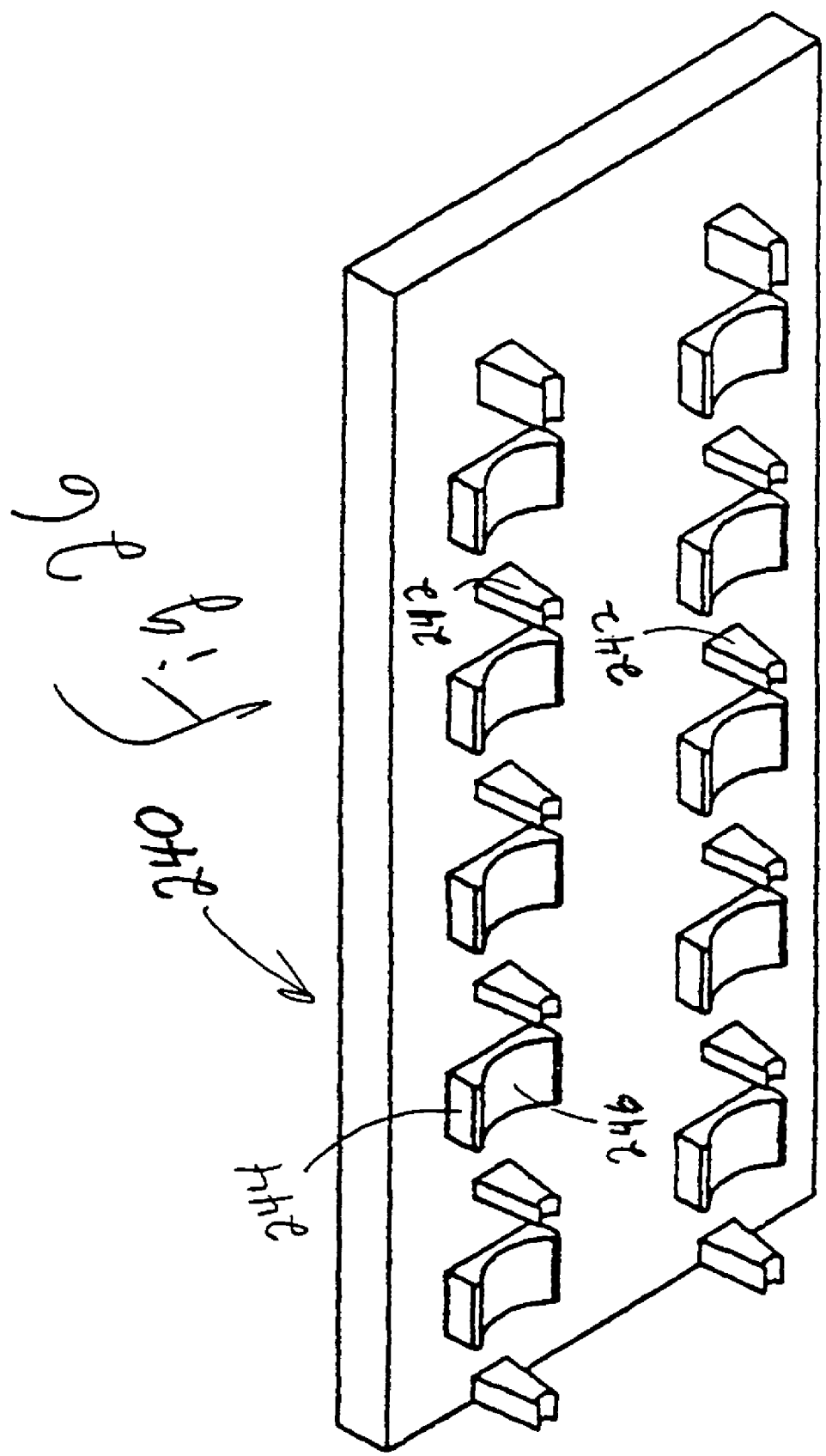
FIG. 26 is a perspective view of the presser foot used with the second modified carrier.
Figure 27:
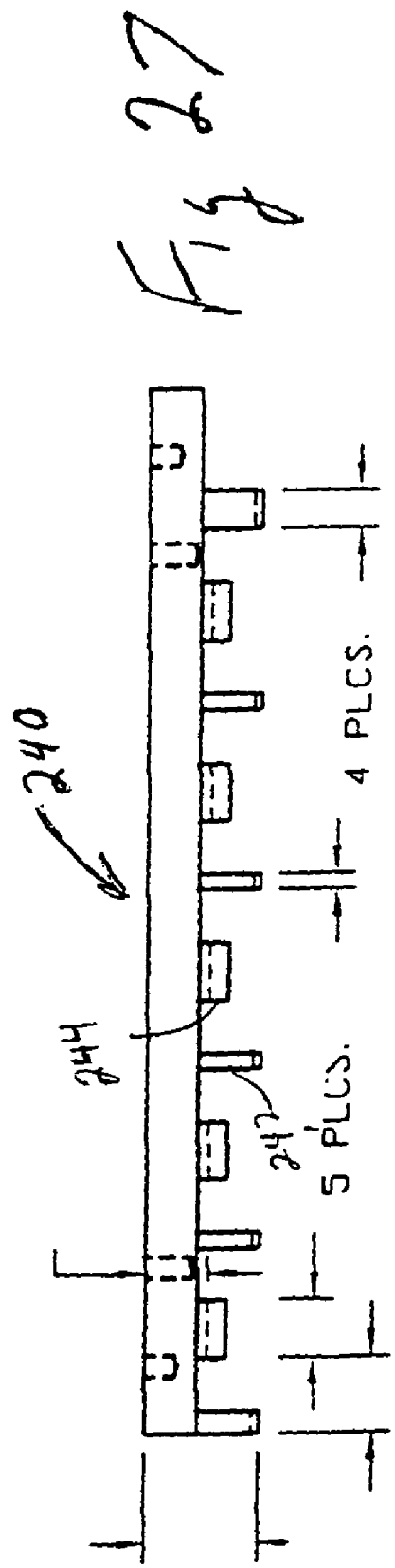
FIG. 27 is a side view of the presser foot of FIG. 26.

With reference now to FIGS. 26 and 27, there is shown a presser foot 240 which is utilized when carriers 230 are used. The presser foot 240 has a dual set of V-shaped extensions 242 to mate with v-shaped notches 236 and define a circular aperture through each barrier for passage of the sticks 12. Again, the presser foot 240 is utilized with adjacent pairs of carriers 230. Also, presser foot 240 is provided with a dual set of a series of extensions 244 having semi-cylindrical surfaces 246 at the end thereof which form a top for each individual egg-shape compartment 232. The surfaces 246 have a cylindrical radius continuing the radius of the cylinder like shape of the egg-shaped compartments 232. This provides complete circumferential support for the chocolate egg or other type of candy, or any other type of food item, within the carrier 230 when skewered by sticks 12.

Again, the first modified carrier 206, presser foot 214, second modified carrier 230 and presser foot 240 are formed of a food grade material, such as glass filled polytetrafluoroethylene, such as Delrin.

Figure 28:
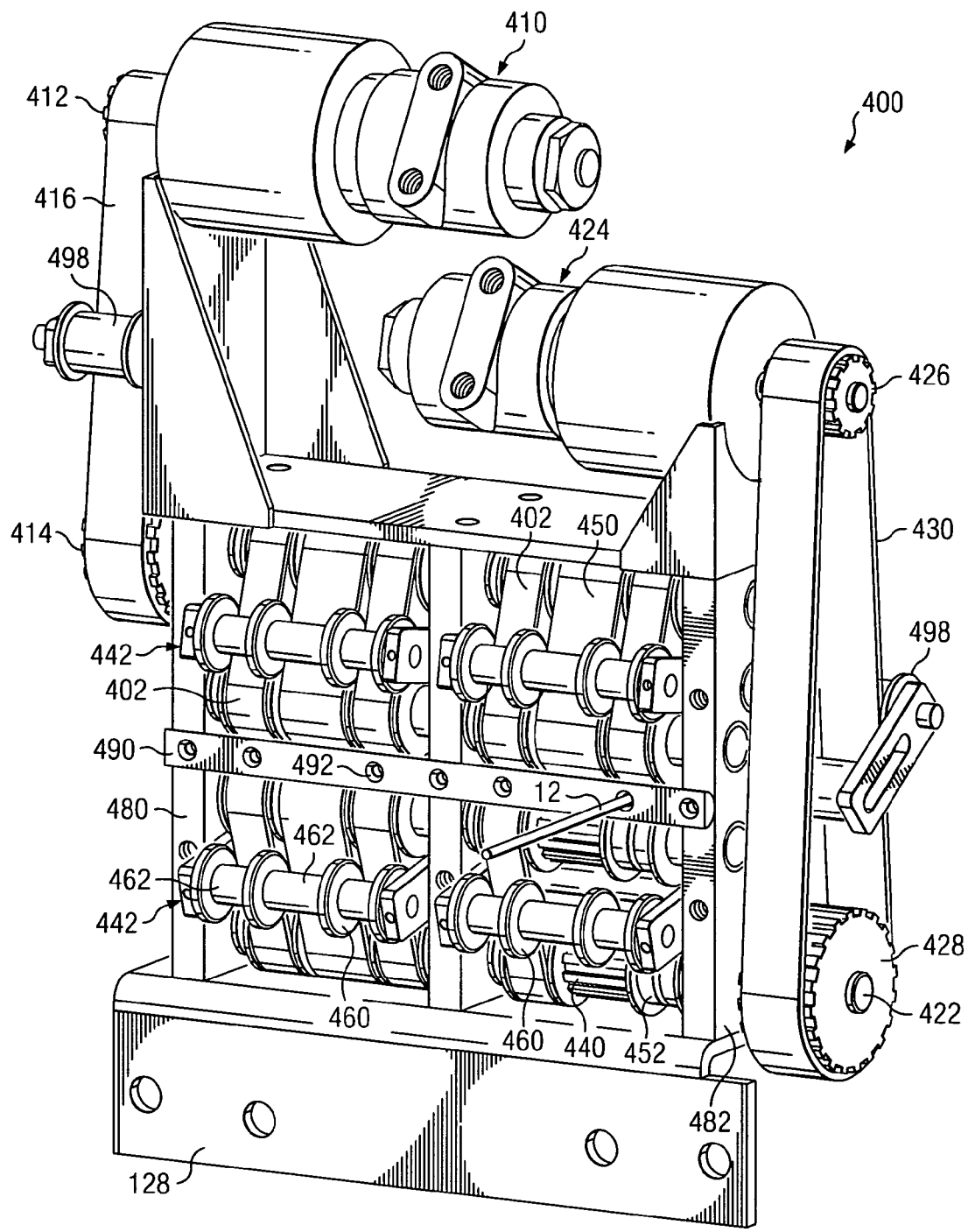
FIG. 28 is a perspective view of a modified insertion device.
Figure 29:
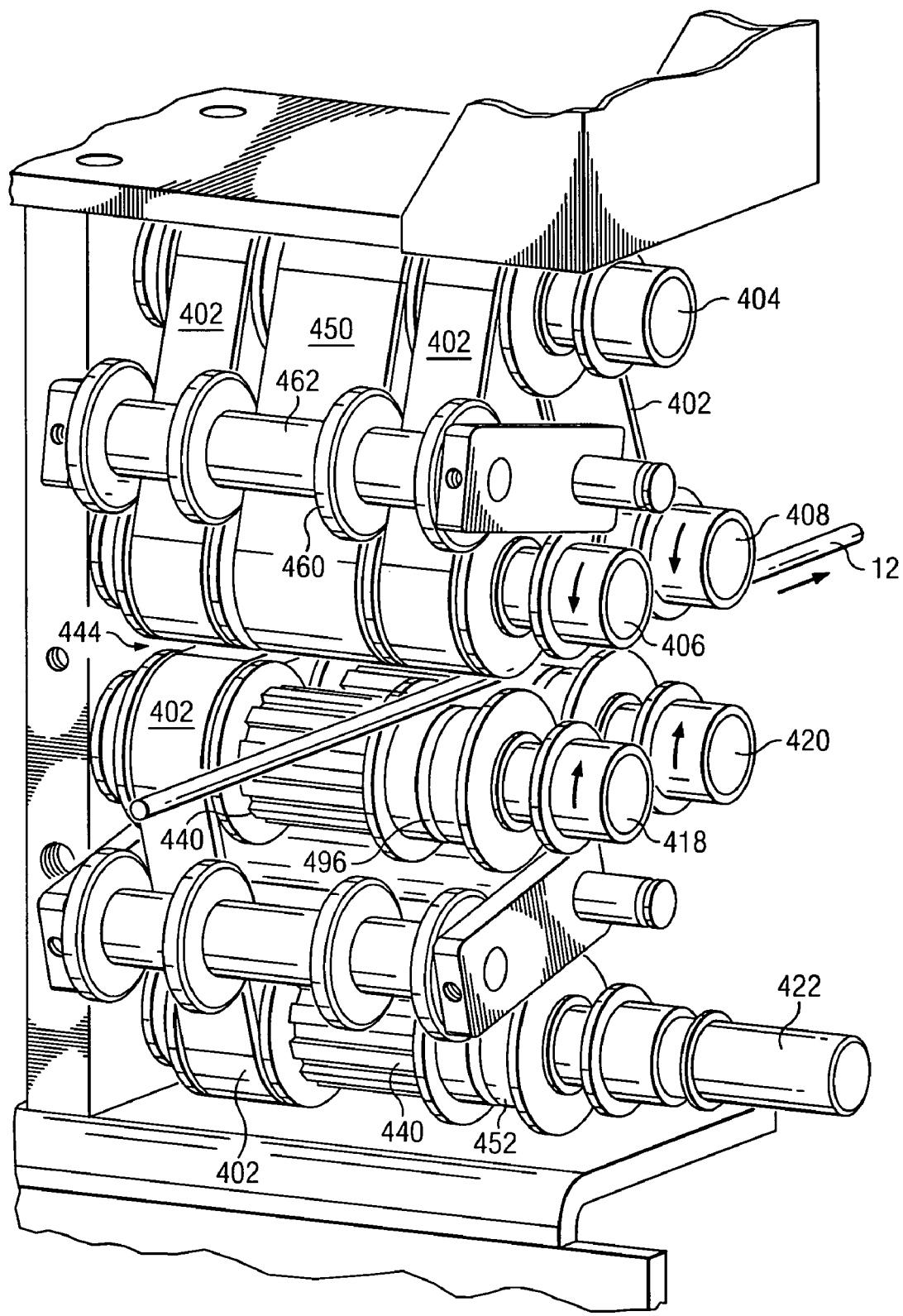
FIG. 29 is a cutaway perspective view of a portion of the insertion device of FIG. 28.
Figure 30:
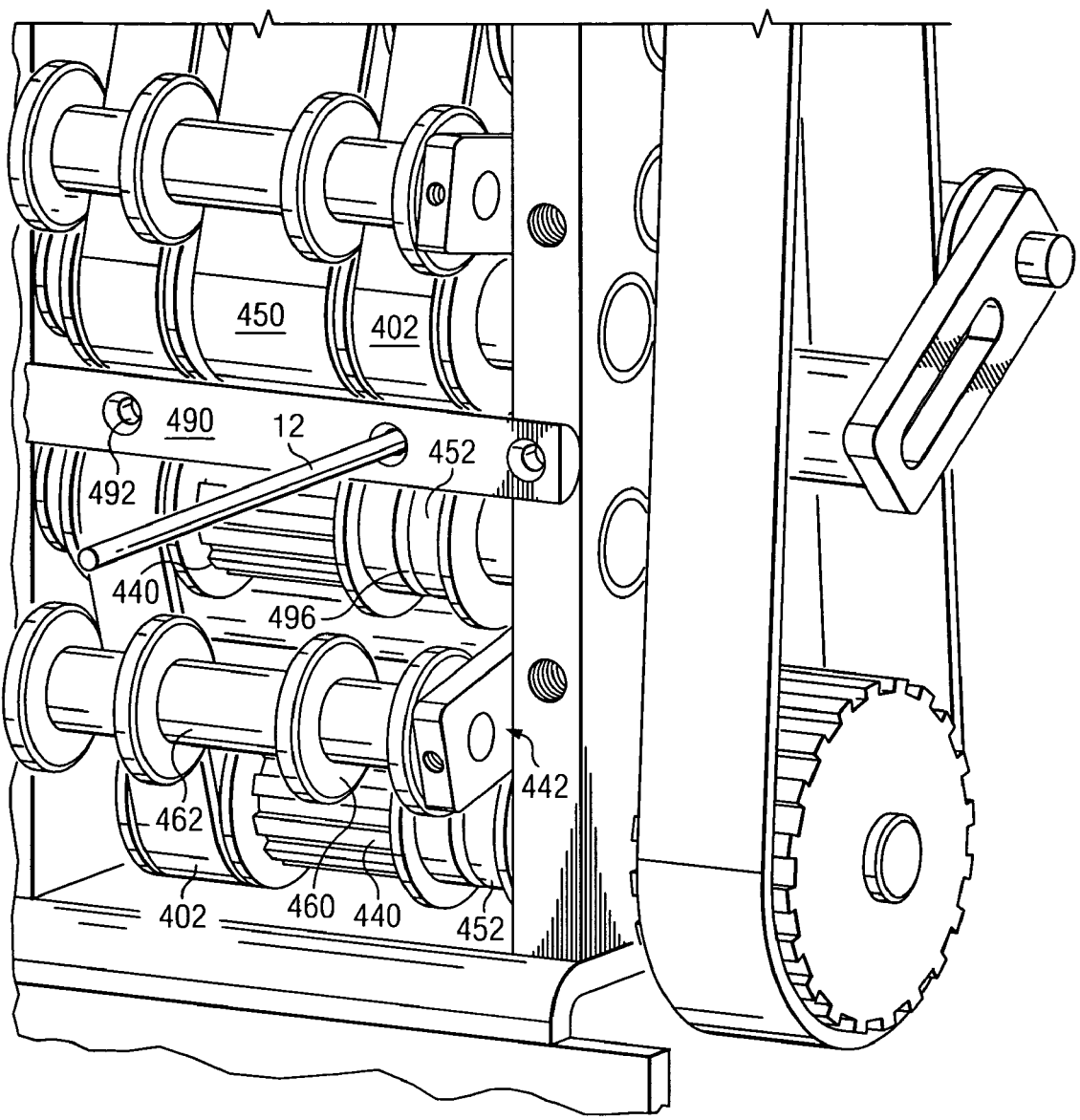
FIG. 30 is a detail view of the insertion device of FIG. 28.

With reference now to FIGS. 28-30, a modified insertion device 400 will be described. The device 400 replaces the insertion device 28. Insertion device 400 utilizes smooth belts 402 to contact the sticks 12 to drive them forward. The belts 402 are preferably formed of urethane. The smooth belts 402 have planar surfaces.

The insertion device 400 mounts three upper shafts 404, 406 and 408 in spaced brackets 480 and 482 for rotation about their elongate axis. The shaft 404 is rotated directly by motor 410 acting through a drive gear 412 on the shaft of motor 410, a driven gear 414 on the shaft 404, and the drive belt 416. Drive belt 416 is tensioned by a tensioner 498. Similarly, three lower shafts 418, 420 and 422 are mounted in brackets 480 and 482 for rotation about their elongate axis. A motor 424 rotates shaft 422 directly through a drive gear 426 on the shaft of the motor 424, a driven gear 428 on the shaft 422 and a drive belt 430. Drive belt 430 is also tensioned by a tensioner 498.

Smooth wheels 452 and toothed wheels 440 are mounted along the shafts 404-408 and 418-422 for rotation with the shafts as shown(the lower rightmost belt 402 and belt 450 have been removed in FIGS. 28-30 to reveal the wheels 452 and 440). The smooth wheels 452 are arranged in groups to support four smooth belts 402 on the lower shafts and four smooth belts 402 on the upper shafts. The toothed wheels 440 are arranged in groups to support two toothed belts 450 on the lower shafts and two toothed belts 450 on the upper shafts, with the teeth on the belts 450 engaging the teeth on the wheels 440. Rotation of the shafts 404 and 422 by motors 410 and 424 causes rotation of the remaining shafts through the toothed wheels 440 and belts 450. The rotation of the shafts rotate the smooth wheels 452. Smooth wheels 452 thus drive the smooth belts 402. By using toothed wheels 440 and toothed belts 450, the shafts rotate at exactly the same speed to facilitate driving the sticks 12.

A spring loaded tensioner 442 is associated with each of the upper and lower shafts. Spring loaded tensioners 442 are mounted in slots in the brackets 480 and 482 permitting limited motion toward and away from the belts 402 and 450. A spring in each slot urges the tensioners 442 toward and into contact with the belts 402 and 450 to tension the belts. The tensioners 442 are also capable of rotation about their elongate axis parallel the axis of rotation of the shafts 404-408 and 418-422 and include annular discs 460 that extend between adjacent belts 402 and 450 to maintain the spacing of the belts and cylindrical portions 462 that bear against each belt 402 and 450 to tension the belts. It is desirable to rotatably mount the tensioners 442 in the brackets 480 and 482 so that the tensioners rotate with the belts 402 and 450 to minimize resistance to belt movement while the tensioners tension the belts.

The insertion device 400 is designed such that the portion of each belt 402 traveling between wheels 452 on the upper shafts 406 and 408 is compressed tightly against a similar portion on a belt 402 traveling between wheels 452 on the lower shafts 418 and 420 along a continuously linear path between the shafts 406, 408, 418 and 420. The motors 410 and 424 rotate in opposite directions such that a stick inserted in the nip 444 formed between the planar surfaces of the two facing belts 402 will be gripped between the belts and driven forward into the food component 14a-g. The facing belts 402 can grip each stick with a gripping force of about 60 pounds, for example.

As seen in the Figures, a guide bar 490 is preferably mounted between the brackets 480 and 482. The guide bar 490 has a series of holes 492 aligned with the nip 444 between the belts 402 to help guide the sticks 12 into the nips.

Each of the smooth wheels 452 preferably has a groove 496 in the center thereof aligned along the direction the stick 12 is driven. A portion of the smooth belt 402 running on the smooth wheels 452 extends into the groove 496 when the belt 402 is under tension induced by the tensioners 442 that causes a groove to be formed in the side of the belt 402 engaging the stick 12, helping to center and guide the stick in the stick drive direction.

Four sticks 12 can be inserted simultaneously by the insertion device 400, and therefor four air jets are used to initially position the sticks through the holes 492 to the nips 444. As will be understood, the insertion device 400 can be designed to insert as many sticks simultaneously as desired, from one to many, by using a corresponding number of pairs of facing belts 402.

A stick 12 is captured along its shaft at its sides between the smooth belts 402 to drive the stick 12 forward. Thus the stick 12 is not driven soley at its end 102.

Although a single embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the spirit and scope of the invention.

I claim:

1. An insertion device for inserting a stick in a food item, the stick having an end, comprising:
    a frame;
    a first smooth belt having a planar surface mounted on the frame;
    a first drive mechanism to drive the first smooth belt so that a portion of the planar surface of the first smooth belt moves along a stick drive direction;
    a second smooth belt having a planar surface mounted on the frame;
    a second drive mechanism to drive the second smooth belt so that a portion of the surface of the second smooth belt moves along a stick drive direction;
    the portions of the first and second smooth belt compressed against each other along a continuously linear path;
    the stick captured between said planar surface portions of the first and second smooth belts to drive the stick in the stick drive direction and insert the stick in the food item, the stick not being driven solely at its end.

2. The insertion device of claim 1 wherein the first and second smooth belts are formed of urethane.

3. The insertion device of claim 1 wherein said first and second drive mechanisms includes three rotatable shafts mounted in the frame with a smooth wheel mounted on each of the shafts to support the smooth belt.

4. The insertion device of claim 3 further including a first drive motor to rotate a first of said rotatable shafts in said first drive mechanism and a second drive motor to rotate a first of said rotatable shafts in said second drive mechanism.

5. The insertion device of claim 4 wherein each of said three rotatable shafts has a toothed wheel mounted thereon, each of said drive mechanisms further having a toothed belt engaging the toothed wheels on said three rotatable shafts to ensure joint rotation of the three rotatable shafts.

6. The insertion device of claim 5 wherein each drive mechanism further includes a tensioner to tension the smooth belt and toothed belt.

7. The insertion device of claim 6 wherein each tensioner includes annular portions to extend between the smooth belt and toothed belt to maintain the belts on the wheels.

8. The insertion device of claim 3 wherein at least one of the smooth wheels has a groove to receive a portion of the smooth belt, the groove extending in the stick drive direction.

9. An insertion device for inserting a stick in a food item, comprising:
 a frame;
 a first smooth belt having a planar surface mounted on the frame;
 a first drive mechanism to drive the first smooth belt so that a portion of the planar surface of the first smooth belt moves along a stick drive direction;
 a second smooth belt having a planar surface mounted on the frame;
 a second drive mechanism to drive the second smooth belt so that a portion of the surface of the second smooth belt moves along a stick drive direction;
 the portions of the first and second smooth belt compressed against each other continuously regardless of the presence of a stick;
 the stick captured between said planar surface portions of the first and second smooth belts to drive the stick in the stick drive direction to insert the stick in the food item wherein a nip is formed between said portions of the first and second smooth belt compressed against each other, no portion of the insertion device being inserted in the food item.

10. The insertion device of claim 9 further including a guide bar mounted on the frame, the guide bar having an aperture aligned with the nip to guide the stick into the nip.

11. The insertion device of claim 9 wherein the first and second smooth belts drive the stick with sufficient force to be inserted into the food item.

12. The insertion device of claim 9 wherein the first and second smooth belts grip the stick with about 60 pounds force.

13. The insertion device of claim 9 wherein the portion of the first smooth belt is vertically above the portion of the second smooth belt.

14. The insertion device of claim 9 further having a third smooth belt having a planar surface mounted on the frame, the first drive mechanism driving the third smooth belt so that a portion of the third smooth belt moves along a second stick drive direction, and a fourth smooth belt having a planar surface mounted on the frame, the second drive mechanism driving the fourth smooth belt so that a portion of the fourth smooth belt moves along the second stick drive direction, a second stick captured between the portions of the third and fourth smooth belts to drive the second stick into a food item simultaneously with the first stick.

15. The insertion device of claim 14 wherein the first drive mechanism has a first drive belt, the first drive belt and first and third smooth belts being side by side and the second drive mechanism has a second drive belt, the second drive belt and second and fourth smooth belts being side by side, the insertion device having annular discs extending between adjacent side by side belts to maintain the spacing of the belts.

16. The insertion device of claim 14 wherein the first and second smooth belts define a first stick insertion mechanism and said third and fourth smooth belts define a second stick insertion mechanism, the insertion device further having third and fourth stick insertion mechanisms to insert four sticks simultaneously into food items.

17. The insertion device of claim 9 having first, second and third upper shafts mounted on said frame for rotation about parallel axes, and first, second and third lower shafts mounted on said frame for rotation about parallel axes, each of said upper and lower shafts having at least one toothed wheel and at least one smooth wheel mounted thereon for rotation with the shaft, the first smooth belt supported on smooth wheels of the upper shafts and the second smooth belt supported on smooth wheels of the lower shafts, the first drive mechanism including a first motor rotating a drive gear on the first upper shaft and a toothed drive belt supported on toothed wheels of the upper shafts to rotate the upper shafts simultaneously, the second drive mechanism including a second motor rotating a drive gear on the first lower shaft and a toothed belt supported on toothed wheels of the lower shafts to rotate the lower shafts simultaneously.

18. An insertion device for inserting a stick in a food item, the stick having sides and an end, comprising:
 a frame;
 a first smooth belt having a planar surface mounted on the frame;
 a first drive mechanism to drive the first smooth belt so that a portion of the planar surface of the first smooth belt moves along a stick drive direction, the portion of the planar surface extending between first and second rotating wheels in the first drive mechanism, said first and second wheels each rotating about an axis of rotation;
 a second smooth belt having a planar surface mounted on the frame;
 a second drive mechanism to drive the second smooth belt so that a portion of the surface of the second smooth belt moves along a stick drive direction, the portion of the planar surface extending between first and second rotating wheels in the second drive mechanism, said first and second wheels each rotating about an axis of rotation, the axes of rotation of the first and second wheels in the first and second drive mechanisms remaining fixed relative each other;
 the portions of the first and second smooth belt compressed against each other continuously regardless of the presence of a stick;
 the stick captured between said planar surface portions of the first and second smooth belts to drive the stick in the stick drive direction to insert the stick in the food item, the insertion device further comprising a kebab stick, the kebab stick captured between said portions of said smooth belts, no portion of the insertion device other than the kebab stick being inserted in the food item, the kebab stick being captured at its sides to drive the stick in the stick drive direction and not driven solely at its end.

* * * * *